United States Patent
Lee et al.

(10) Patent No.: US 10,539,978 B2
(45) Date of Patent: Jan. 21, 2020

(54) MOBILE TERMINAL AND CONTROL METHOD THEROF

(71) Applicant: LG ELECTRONICS INC., Seoul (KR)

(72) Inventors: Haklim Lee, Seoul (KR); Jongbeom Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 636 days.

(21) Appl. No.: 15/250,366

(22) Filed: Aug. 29, 2016

(65) Prior Publication Data

US 2017/0068275 A1    Mar. 9, 2017

Related U.S. Application Data

(60) Provisional application No. 62/215,700, filed on Sep. 8, 2015.

(30) Foreign Application Priority Data

Jun. 3, 2016   (KR) .................. 10-2016-0069254
Jun. 15, 2016  (KR) .................. 10-2016-0074465

(51) Int. Cl.
*G06F 1/16*      (2006.01)
*H04M 1/02*    (2006.01)
(Continued)

(52) U.S. Cl.
CPC .......... *G06F 1/1643* (2013.01); *G06F 1/1616* (2013.01); *G06F 1/1652* (2013.01);
(Continued)

(58) Field of Classification Search
CPC .... G06F 1/1652; G06F 1/1641; G06F 1/1616; G06F 1/1681; G06F 1/1677; G06F 1/16; G06F 3/0487; H04M 1/0268
See application file for complete search history.

(56) References Cited

U.S. PATENT DOCUMENTS 7,685,676 B2 *   3/2010   McClellan ............... E05D 1/02
                                                              16/221
2004/0266502 A1 * 12/2004 Holtorf .................... B32B 3/04
                                                              455/899
(Continued)

FOREIGN PATENT DOCUMENTS

EP      2546720       1/2013
EP      2811365      12/2014
(Continued)

OTHER PUBLICATIONS

European Patent Office Application Serial No. 16187645.3, Search Report dated Jul. 14, 2017, 13 pages.

(Continued)

*Primary Examiner* — Dimary S Lopez Cruz
*Assistant Examiner* — Ingrid D Wright
(74) *Attorney, Agent, or Firm* — Lee, Hong, Degerman, Kang & Waimey

(57) ABSTRACT

A mobile terminal includes a body including first and second bodies and being in one of a first state where the first and second bodies are positioned on the same plane and a second state where one of the first and second bodies is folded with respect to the other, and a display assembly disposed at one side of the first and second bodies, at least part of the display assembly being superposed on the first and second bodies. The display assembly includes a flat area remaining flat in the second state, and a bent area bent in the second state. The display assembly includes a display panel, a first layer provided to the front side of the display panel, and a second layer provided to the rear side of the display panel.

12 Claims, 51 Drawing Sheets

(51) Int. Cl.
*G02F 1/1333* (2006.01)
*G02F 1/1347* (2006.01)
*G06F 3/0487* (2013.01)

(52) U.S. Cl.
CPC .......... *G06F 1/1681* (2013.01); *G06F 3/0487* (2013.01); *H04M 1/0268* (2013.01); *G02F 1/13338* (2013.01); *G02F 1/13471* (2013.01); *G06F 2203/04102* (2013.01); *H04M 1/0216* (2013.01)

(56) References Cited

U.S. PATENT DOCUMENTS

| | | | |
|---|---|---|---|
| 2012/0011938 A1* | 1/2012 | Grange | G01B 7/18 73/763 |
| 2012/0044620 A1* | 2/2012 | Song | G06F 1/1616 361/679.01 |
| 2014/0118902 A1 | 5/2014 | Kim | |
| 2014/0355195 A1* | 12/2014 | Kee | G06F 1/1616 361/679.27 |
| 2015/0049428 A1* | 2/2015 | Lee | G06F 1/1652 361/679.27 |
| 2015/0055287 A1 | 2/2015 | Seo | |
| 2015/0185782 A1* | 7/2015 | Kim | G06F 1/1652 349/12 |
| 2015/0220117 A1 | 8/2015 | Lee et al. | |
| 2015/0233162 A1 | 8/2015 | Lee et al. | |
| 2015/0241925 A1* | 8/2015 | Seo | G06F 1/1652 361/679.27 |

FOREIGN PATENT DOCUMENTS

| | | |
|---|---|---|
| EP | 2840460 | 2/2015 |
| EP | 2908236 | 8/2015 |

OTHER PUBLICATIONS

European Patent Office Application Serial No. 16187645.3, Search Report dated Mar. 3, 2017, 7 pages.

\* cited by examiner $L1 = \pi R1$
$L2 = \pi R2$ $L2 - L1 > 0$ (a)

(b)

(a)

(b)

(a)

(b)

(a)

(b)

(a)

(b)

(a)

(b)

(a)

(b)

(a) TST1 — TSW1

(b) TST2 — TSW2

(a)

(b)

MOBILE TERMINAL AND CONTROL METHOD THEROF

CROSS-REFERENCE TO RELATED APPLICATIONS

Pursuant to 35 U.S.C. § 119(a), this application claims the benefit of earlier filing date and right of priority to Korean Patent Application No. 10-2016-0074465, filed on Jun. 15, 2016 and 10-2016-0069254, filed on Jun. 3, 2016, and also claims the benefit of U.S. Provisional Application No. 62/215,700, filed on Sep. 8, 2015, the contents of which are all hereby incorporated by reference herein in their entirety.

TECHNICAL FIELD

The present invention relates to a mobile terminal and, more particularly, to a bendable mobile terminal which minimizes stress applied to a display panel using a flexible display panel including a plurality of layers.

DISCUSSION OF THE RELATED ART

As functions of terminals such as personal computers, laptop computers, cellular phones diversify, the terminals become multimedia players having multiple functions for capturing pictures or moving images, playing music, moving image files and games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions.

To support and enhance the increasing number of functions in a terminal, improving a structural part and/or a software part of the terminal would be desirable.

Various types of mobile terminals, for example, a mobile terminal having a bendable display, are under study. For bendable displays, a configuration for effectively guiding display bending is needed.

SUMMARY

The present invention provides a bendable mobile terminal which minimizes stress applied to a display panel using a flexible display panel including a plurality of layers.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

Figure 1:
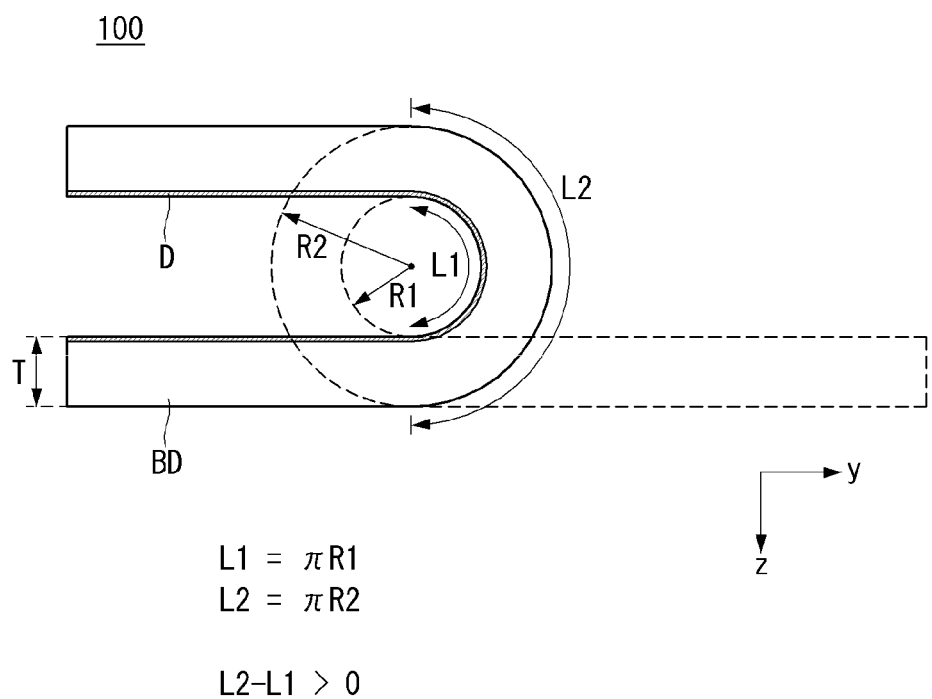
FIG. 1 illustrates operation of a mobile terminal.

FIG. 1 illustrates operation of a mobile terminal.

As shown, a mobile terminal 100 may have a foldable body. For example, the body of the mobile terminal 100 may be folded such that both edges thereof are close to and/or contact each other. A display D may be provided to at least one side of the body BD.

The display D may be formed on the overall surface of at least one side of the body BD. This feature may differ from conventional flip-phones. That is, the mobile terminal 100 according to an embodiment of the present invention may have a display ranging from one edge to the other edge of the body BD, distinguished from a conventional folder phone having a display provided to part of one side thereof.

The display D may be flexible. That is, when the body BD is folded, the display D is also folded. This feature may differ from conventional displays. The flexible display D may be provided to the substantially overall surface of one side of the body BD.

The mobile terminal 100 may have a specific thickness. That is, the mobile terminal 100 may have a thickness T in a z-direction. The thickness of the mobile terminal 100 may be the sum of thicknesses of components of the mobile terminal 100, such as the body BD and the display D, in the z-direction.

The mobile terminal 100 may be in a first state S1 or a second state S2.

The first state S1 may be a state in which the body BD is unfolded. For example, if the body BD is divided into a plurality of regions, a state in which the regions of the body BD are located in the same plane may be the first state S1. In the first state S1, the mobile terminal 100 may be seen like a stick shape.

The second state S2 may be a state in which the body BD is folded. For example, a state in which one of the regions of the body BD is folded to another region may be the second state S2. In the second state, the length of the mobile terminal 100 may be seen as half the length.

When the body BD is folded and thus the first state S1 changes to the second state S2, a length difference between the inside surface and the outside surface of the body BD may be generated. The length difference may be caused by the thickness T of the mobile terminal 100. That is, the thickness T may cause a difference between a first radius R1 with respect to the inside surface of the body BD and a second radius R2 with respect to the outside surface of the body BD. Due to the difference between the first radius R1 and the second radius R2, the length of the outside surface of the body BD may become greater than the length of the inside surface of the body BD in the second state S2 in which the body BD is folded. If the length of the outside surface of the body BD becomes greater than the length of the inside surface of the body BD, the display D attached to the inside surface of the body BD may be wrinkled when the body BD is folded.

In the second state S2, the first radius R1 may be needed. This can be clearly understood considering that the display D may be damaged when the display D provided to the inside surface of the body BD is folded flat. Accordingly, the mobile terminal 100 may need a structure for maintaining the first radius R1 in the second state.

Figure 2:
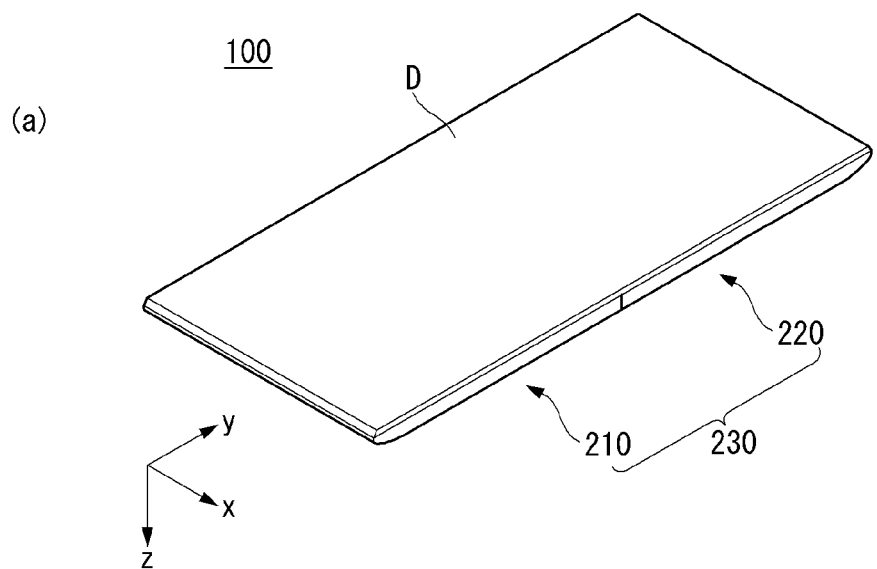
FIGS. 2 to 4 illustrate a mobile terminal according to an embodiment of the present invention.
Figure 2:
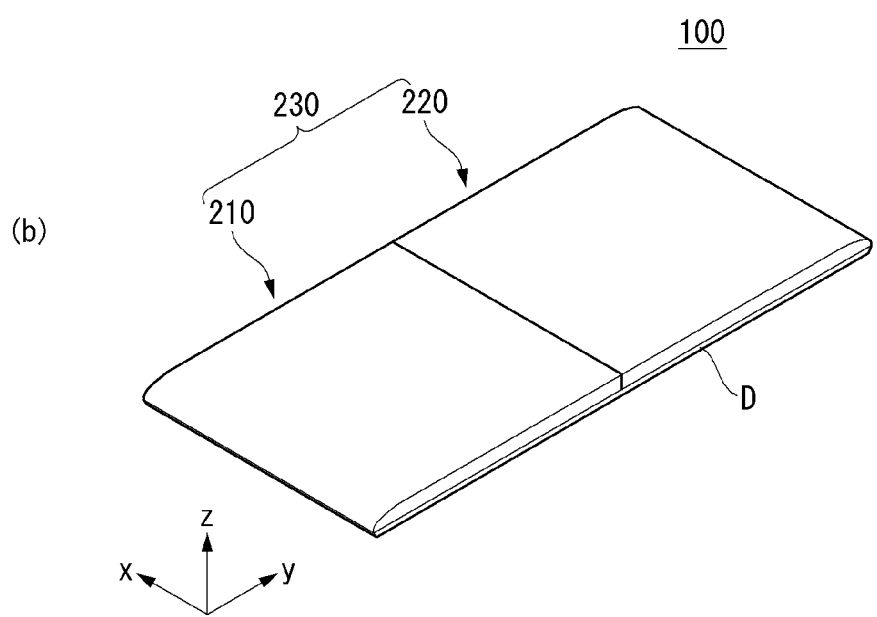
Figure 3:
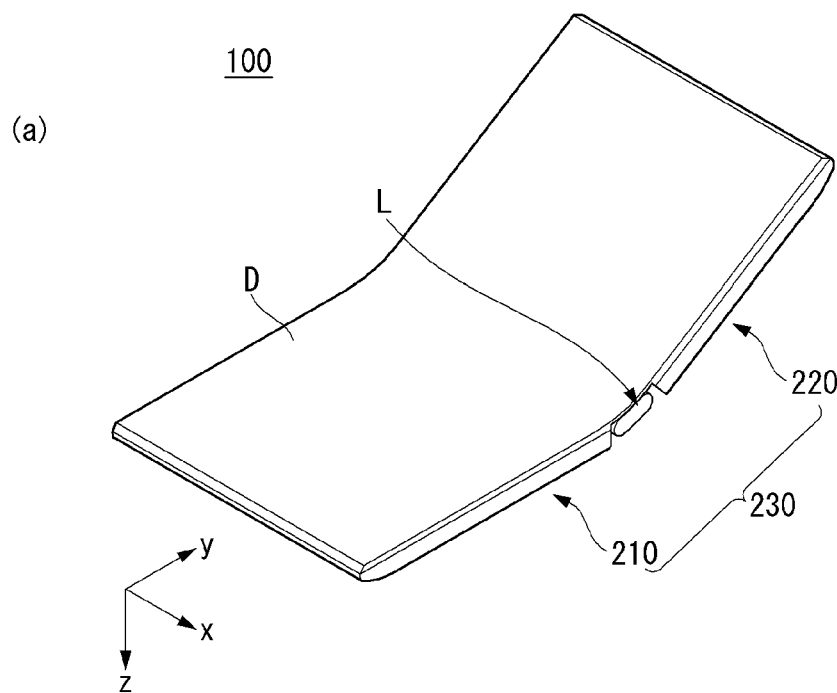
Figure 3:
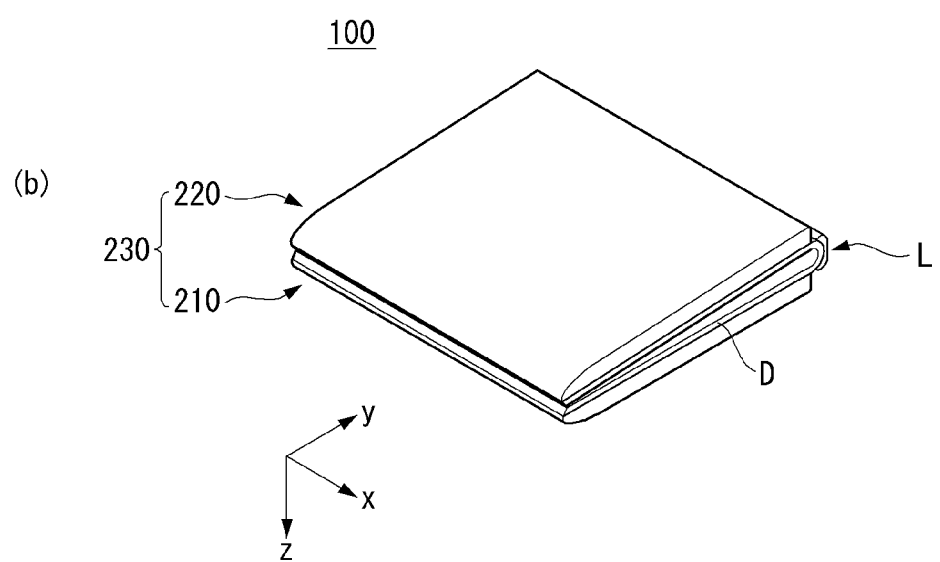
Figure 4:
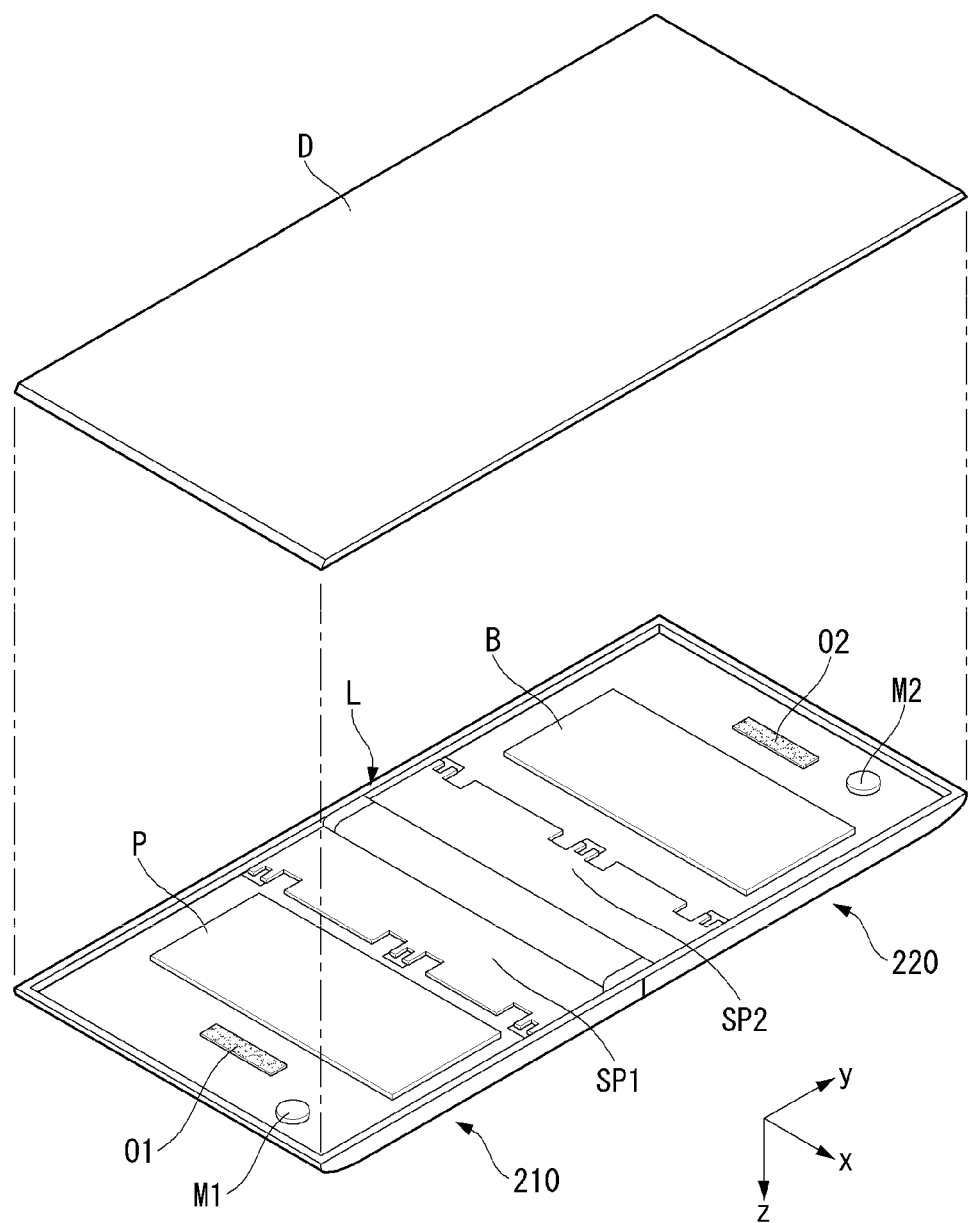

FIGS. 2 to 4 illustrate a mobile terminal according to an embodiment of the present invention.

As shown in the figures, the mobile terminal 100 according to an embodiment of the present invention may be in one of the first state and the second state and/or in between the first and second states.

FIG. 2 illustrates the front side and the rear side of the mobile terminal 100 according to an embodiment of the present invention when the mobile terminal 100 is in the first state S1. As shown, the body 230 of the mobile terminal 100 may include a first body 210 and a second body 220. The display D may be located on the first and second bodies 210 and 220. The display D may be continuously located on the first and second bodies 210 and 220.

FIG. 3(a) illustrates a case in which the mobile terminal 100 according to an embodiment of the present invention is in between the first and second states. As shown, the mobile terminal 100 may be in a third state in which the first and second bodies 210 and 220 of the mobile terminal 100 are bent at a predetermined angle. Changing from the first state to the second state and/or fixing to the third state may be accomplished by a hinge assembly L that connects the first and second bodies 210 and 220.

FIG. 3(b) illustrates a case in which the mobile terminal 100 according to an embodiment of the present invention is in the second state. As shown, the mobile terminal 100 may be in a state in which the first and second bodies 210 and 220 rotate about the hinge assembly L. In the second state, the first and second bodies 210 and 220 may overlap. In the second state, the display D may be located on the inside surfaces of the first and second bodies 210 and 220.

FIG. 4 illustrates the position of the hinge assembly L included in the mobile terminal 100 according to an embodiment of the present invention. As shown, the hinge assembly L may be provided between the first and second bodies 210 and 220.

The mobile terminal 100 may have a board P therein. The board P may be loaded on one of the first and second bodies 210 and 220. For example, the board P may be located on the first body 210.

The mobile terminal 100 may have a battery B provided therein. The battery B may be located on the other of the first and second bodies 210 and 220. That is, the battery B may be provided to the body other than the body to which the board P is provided. For example, the battery B may be located on the second body 220.

A plurality of audio output units O1 and O2 and/or a plurality of microphones M1 and M2 may be located inside of the mobile terminal 100. For example, the audio output units O1 and O2 and the microphones M1 and M2 may be provided to one edge and the other edge of the first and second bodies 210 and 220.

The hinge assembly L may be located inside of the mobile terminal 100. The hinge assembly L may connect the first and second bodies 210 and 220. The hinge assembly L may be positioned between the first and second bodies 210 and 220.

The hinge assembly L may be coupled to the first and second bodies 210 and 220 by means of supporting plates SP coupled to both sides thereof.

Figure 5:
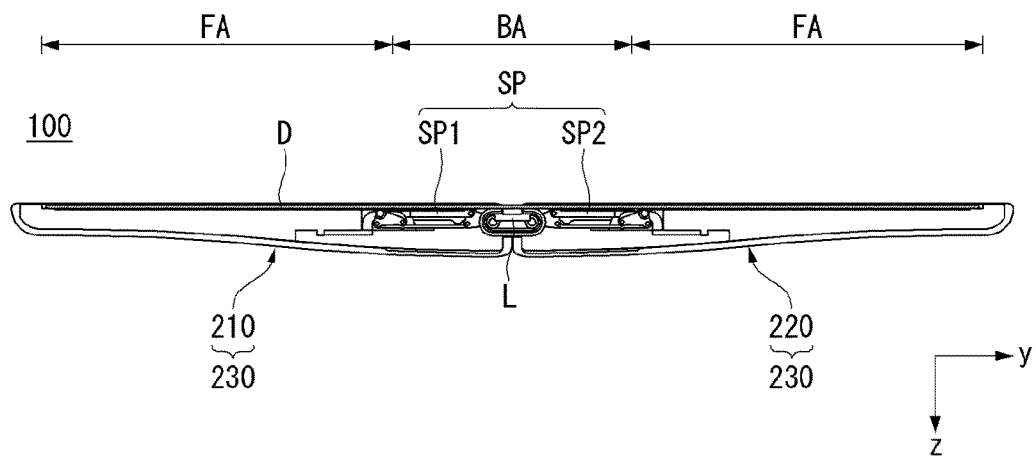
FIGS. 5 and 6 illustrate changes in a display according to operations of the mobile terminal according to an embodiment of the present invention.
Figure 5:
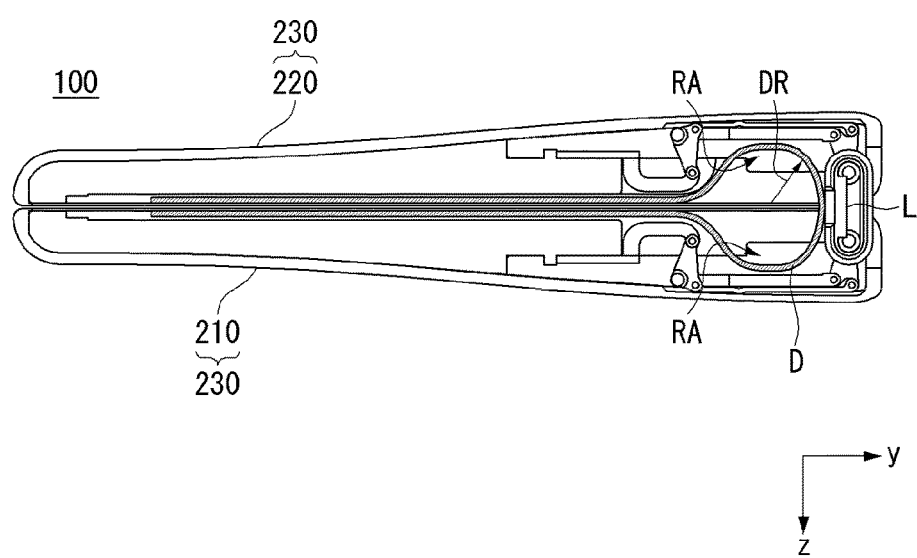
Figure 6:
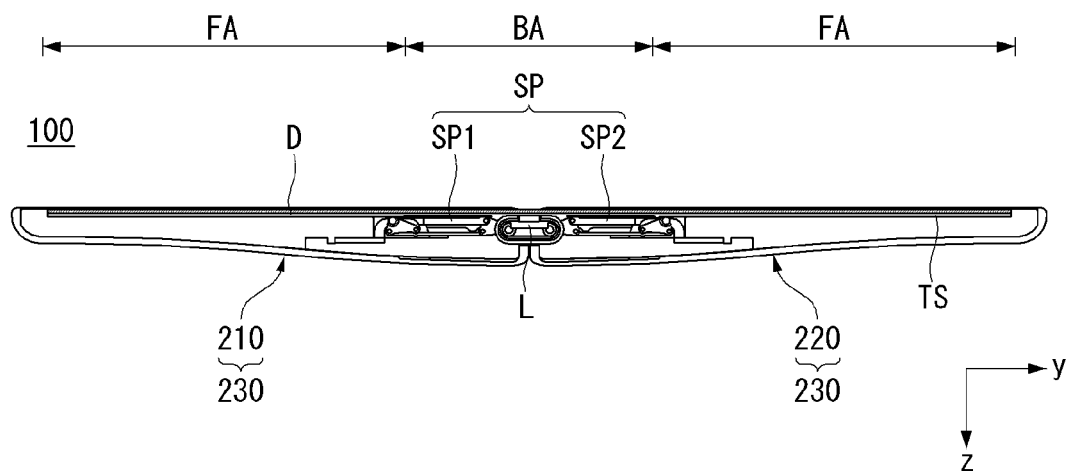
Figure 6:
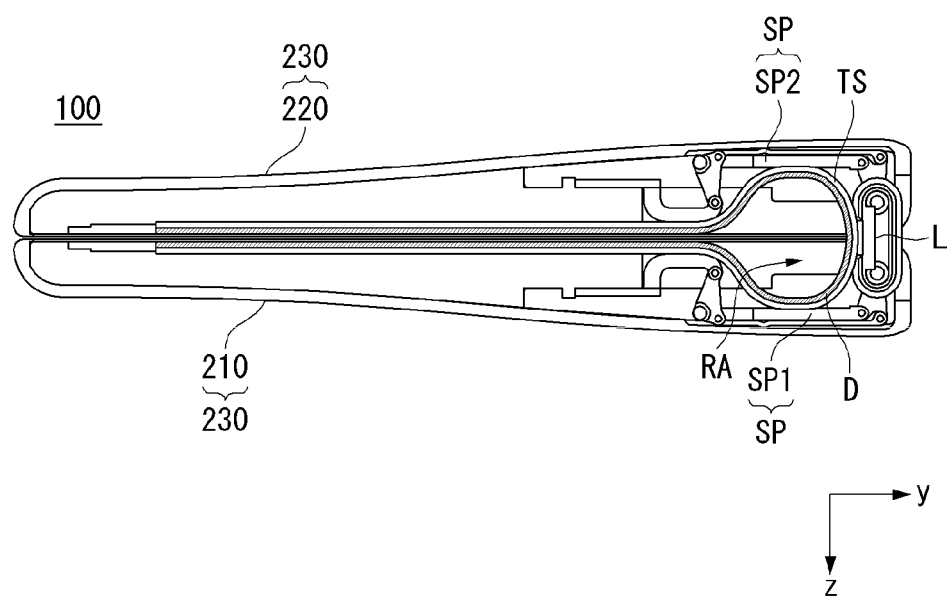

FIGS. 5 and 6 illustrate changes in the display according to operations of the mobile terminal according to the present invention.

As shown in FIG. 5(a), in the first state, the center of the display D may be located on the hinge assembly L and both sides thereof may be respectively located on the first and second bodies 210 and 220.

The display D may be flat in the first state. That is, the display D is not bent. In this case, the height of the upper surfaces of the supporting plates SP coupled to the hinge assembly L may be the same as the hinge assembly L and the first and second bodies 210 and 220. Accordingly, the user may further concentrate on the flat screen of the flat display D.

Referring to FIG. 5(*b*), at least part of the display D may be moved to a recess area (RA) in the second state. The recess area RA may be formed when the supporting plates SP move to the inside of the body 230. The at least part of the display D may be moved to the recess area RA, having a predetermined curvature DR. Accordingly, a length difference between the inside surface and the outside surface of the body 230 may be compensated.

As the mobile terminal 100 changes from the first state to the second state, the supporting plates SP may slide to the inside of the body 230. Accordingly, the display D supported by the supporting plates SP may be recessed to the inside of the body 230 along with the supporting plates SP having the predetermined curvature DR.

The center of the hinge assembly L in the recess area RA may come into contact with the display D. That is, a display portion bent in the second state, in the recess area RA, does not come into contact with the hinge assembly L.

Since the center of the hinge assembly L contacts the display D, the display D may be recessed to the recess area RA to have the predetermined DR during change from the first state to the second state. If the center of the hinge assembly L does not contact the display D, the display D may change into a random shape without having a curvature. In this case, the display D may be twisted inside of the body. Furthermore, the display D may be wrinkled.

The display D may remain flat in an area other than the recess area RA in the second state. Accordingly, the display D may be attached to the body 230 in the area other than the recess area RA.

A portion of the display D located in the recess area RA may be referred to as a bent area BA and a portion of the display D located outside the recess area RA may be referred to as a flat area FA. That is, a portion of the display D, which is recessed or bent according to state change, may be referred to as the bent area BA and a portion of the display D, which is not recessed or bent irrespective of state change, may be referred to as the flat area FA.

Referring to FIG. 6(*a*), an elastic layer TS may be provided to at least one side of the display D.

The elastic layer TS may be located between the display D and the first and second bodies 210 and 220. That is, elastic layer TS may not be exposed to the outside by the display D. The elastic layer TS may contain a material having high elasticity, which prevents generation of cracks in the display D when the display D is bent multiple times. That is, tensile strength generated in the exterior of the display D when the display D is bent multiple times may be offset by elastic restoring force of the elastic layer TS. For example, the elastic layer TS may contain silicon.

The elastic layer TS may guide the display D. For example, when pressure is applied to the display D in the first state in which the display D is flat, the elastic layer TS may guide the display D to remain flat. For example, when the display D is in the second state and/or changes to the second state, the elastic layer TS may guide the display D such that stress applied to the display D is minimized.

Referring to FIG. 6(*b*), the elastic layer TS is attached to the display D and thus may be recessed to the inside of the body 230 together with the display D. In this case, tension and shrinkage of the elastic layer TS may be repeated according to movement of the display D due to recessing. Accordingly, the elastic layer TS may be firmly attached to the display D such that the elastic layer TS is not separated from the display D.

The elastic layer TS may prevent the display D from being wrinkled or damaged when the display D is recessed or bent. That is, the elastic layer TS may prevent generation of cracks or wrinkles due to repeated shrinkage and relaxation of the display D.

The mobile terminal 100 according to the present invention may have the elastic layer TS attached to at least one side of the display D. Accordingly, the display D may be moved more flexibly and maintain flatness when the body 230 is in the second or third state.

Figure 7:
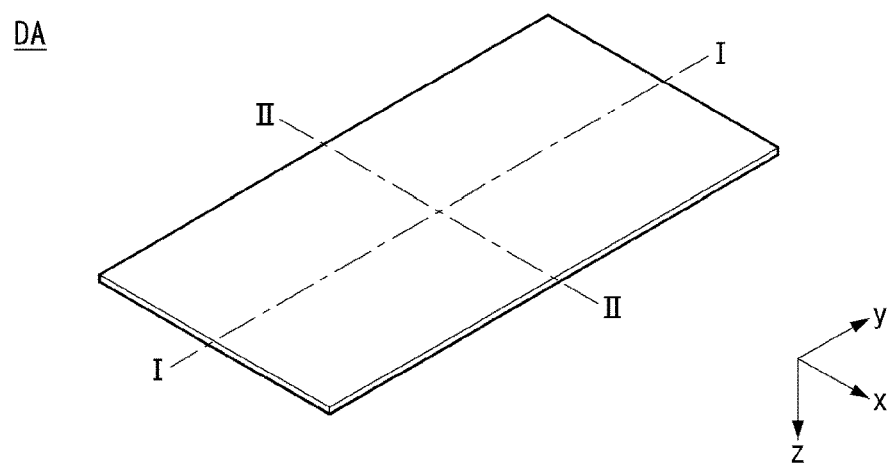
FIGS. 7 and 8 illustrate a display assembly structure of the mobile terminal according to an embodiment of the present invention.
Figure 7:
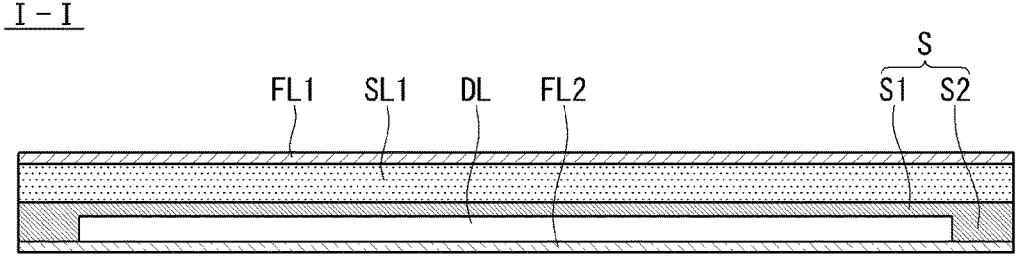
Figure 8:
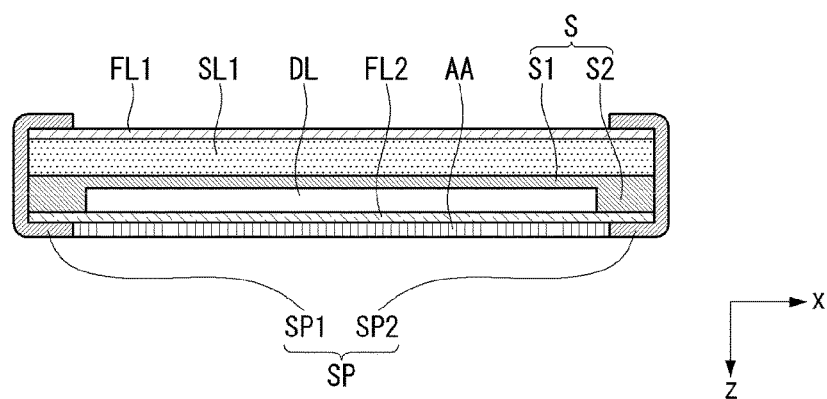

FIGS. 7 and 8 illustrate a structure of a mobile terminal display assembly according to an embodiment of the present invention.

As shown, a display assembly DA according to an embodiment of the present invention may include a plurality of layers. The display assembly DA having the layers may minimize stress applied to a display panel DL. At least one of the layers may be formed of silicon.

Referring to FIG. 7, the display assembly DA may include a first layer FL1, a silicon layer SL1, an adhesive layer S, the display panel DL and a second layer FL2. The display assembly DA may include part or all of the aforementioned components. For example, at least one of the first and second layers FL1 and FL2 may be omitted. The display assembly DA may be configured such that stress applied to the display panel DL is minimized.

The first and second layers FL1 and FL2 may be respectively provided to the front side and the rear side of the display panel DL. The first and second layers FL1 and FL2 may be formed of at least one of a FET, a film and silicon.

Each of the first and second layers FL1 and FL2 may have a predetermined modulus. For example, the modulus of the first layer FL1 may differ from the modulus of the second layer FL2. For example, the modulus of the first layer FL1 may be greater than the modulus of the second layer FL2 and vice versa. The modulus may refer to a layer property. The modulus may refer to elastic modulus.

The moduli of the first and second layers FL1 and FL2 may be determined on the basis of the thickness of the display assembly DA, the position of the display panel DL in the display assembly DA, distances between the display panel DL and the first and second layers FL1 and FL2, moduli of components other than the first and second layers FL1 and FL2 and the like. The moduli of the first and second layers FL1 and FL2 may be determined such that a neutral surface (NL of FIG. 14) is formed in the display panel DL. For example, if the neutral surface (NL of FIG. 14) is located between the display panel DL and the first layer FL1, the first layer FL1 may be formed of a material having lower modulus.

The silicon layer SL1 may provide elasticity to the display assembly DA. For example, the user who touches the first layer FL1 can feel a slight cushion due to elasticity of the silicon layer SL1.

The silicon layer SL1 may have optical properties. For example, the silicon layer SL1 may be transparent or almost transparent. Owing to the transparent silicon layer SL1, the user can view images displayed on the display panel DL without any difficulty.

The adhesive layer S may attach the silicon layer SL1 to the display panel DL. The adhesive layer S may be an optical clear resin (OCR). The adhesive layer S may include a first adhesive layer S1 and a second adhesive layer S2.

The first adhesive layer S1 may be provided to the front surface of the display panel DL.

The second adhesive layer S2 may be provided to the side of the display panel DL. The front surface and side of the display panel DL may be sealed by the first adhesive layer S1 provided to the front surface of the display panel DL and the second adhesive layer S2 provided to the side of the display panel DL and connected to the first adhesive layer S1. Accordingly, the display panel DL may be protected from dust, moisture and the like.

The display panel DL may be a part that substantially displays images in the display assembly DA. The display panel DL may be an OLED. The display panel DL corresponding to an OLED may be thin since the display panel DL does not require a backlight unit.

The display panel DL may have flexibility. Accordingly, the display panel DL may be folded or unfolded by external force applied by the user.

Even if the display panel DL has flexibility, it is desirable that minimum stress be applied to the display panel DL. For example, if the neutral surface is located in a part other than the display panel DL when the display assembly DA is bent, a tensile force or a compressive force may be applied to the display panel DL. Modulus of components of the display assembly DA according to an embodiment of the present invention may be controlled such that the neutral surface is located in the display panel DL.

FIG. 8 is a cross-sectional view of the display assembly DA taken along line II-II.

As shown, the display assembly DA may further include a side protection layer SP.

The side protection layer SP may be provided along the side of the display assembly DA. The side protection layers SP may be provided to both sides of the display assembly DA.

The side protection layer SP may prevent the side of the display assembly DA from being exposed to the outside. That is, the side protection layer SP may cover the side of the display assembly DA and at last part of the upper surface and/or the lower surface adjoining the side of the display assembly DA.

Figure 17:
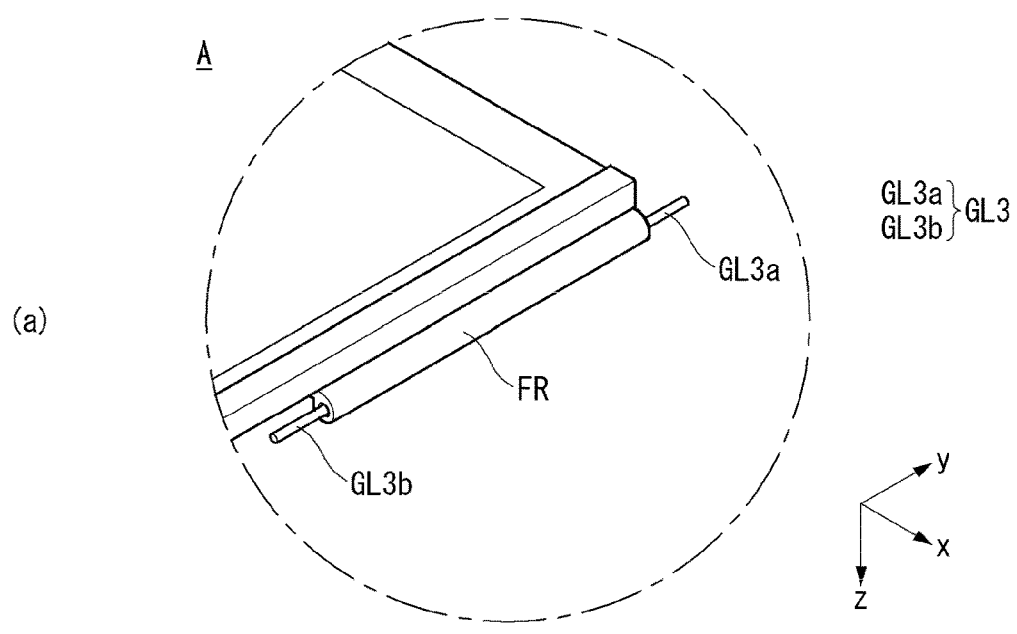
Figure 17:
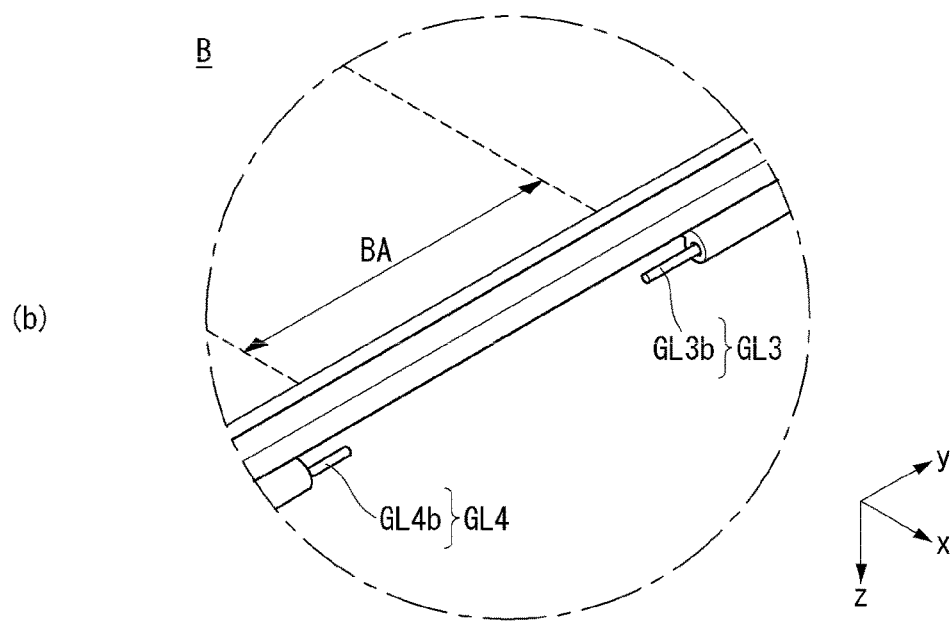

The lower surface of the side protection layer SP may be attached to a frame (FR of FIG. 17). That is, the display assembly may be fixed to the frame (FR of FIG. 17) through the side protection layer SP. A shape memory alloy or an amorphous alloy AA may be provided between the side protection layers SP located at both sides of the display assembly DA. In this case, the display assembly may be fixed to the frame (FR of FIG. 17) by the side protection layers SP and/or the amorphous alloy AA.

Figure 9:
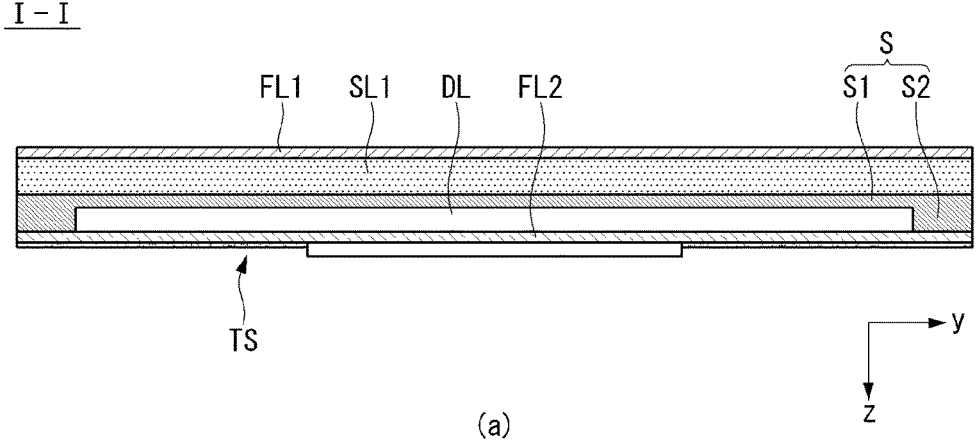
FIGS. 9 to 11 illustrate a display assembly structure of the mobile terminal according to an embodiment of the present invention.
Figure 9:
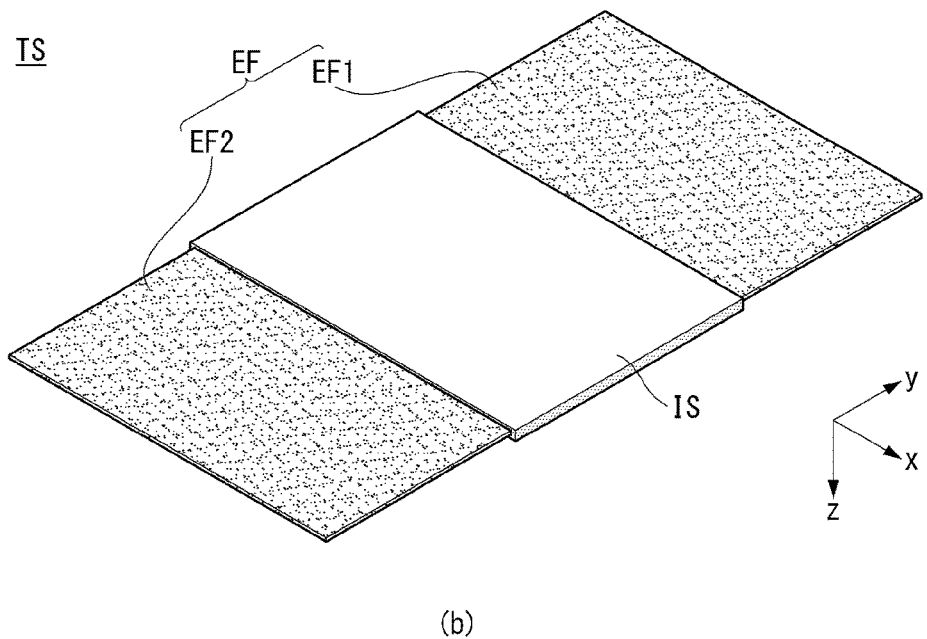
Figure 10:
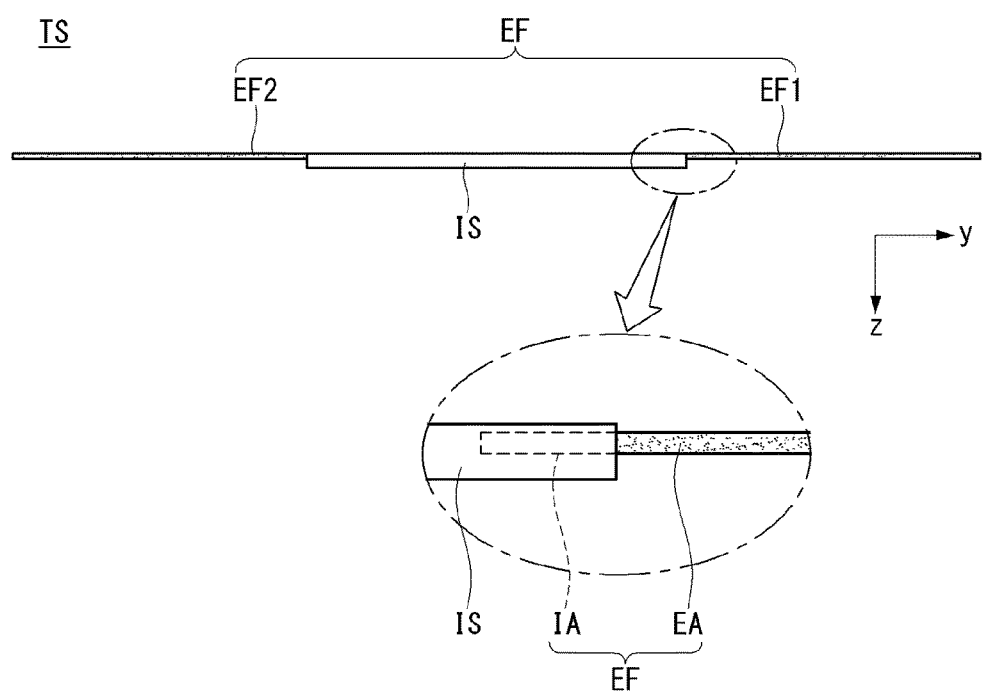
Figure 11:
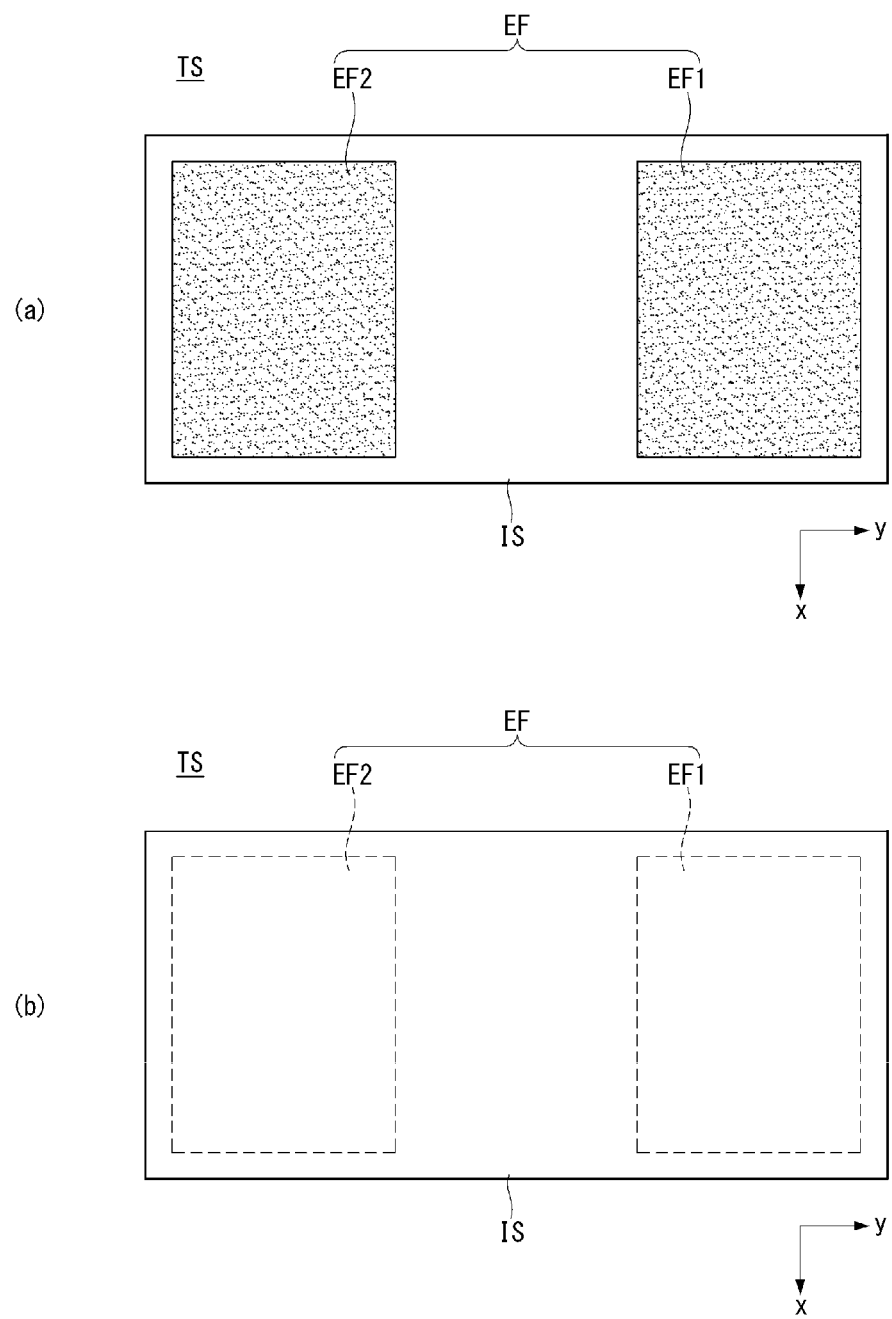

FIGS. 9 to 11 illustrate a structure of the mobile terminal display assembly according to an embodiment of the present invention.

As shown, the display assembly DA of the mobile terminal 100 according to an embodiment of the present invention may include the elastic layer TS. The elastic layer TS may more effectively support the display assembly DA. The elastic layer TS may improve flatness of the display assembly DA. The elastic layer TS may provide restoring force such that the bent display assembly DA becomes flat.

Referring to FIG. 9(a), the elastic layer TS may be provided to the lower surface of the display assembly DA. The elastic layer TS may be attached to the lower surface of the display assembly DA.

Referring to FIG. 9(b), the elastic layer TS may include a silicon area IS and an SUS area EF.

The silicon area IS may be formed of an elastic material. The silicon area IS may be formed of a ductile material such as silicon. The silicon area IS may be formed of a material that is easily bent when external force is applied thereto. The silicon area IS may correspond to the bent area (BA of FIG. 6).

The SUS area EF may be provided to both sides of the silicon area IS. The SUS area EF may be formed of a rigid material compared to the silicon area IS. For example, the SUS area EF may be configured as a metal plate. The SUS area EF may correspond to the flat area (FA of FIG. 6).

The SUS area EF may include first and second SUS areas EF1 and EF2. The first and second SUS areas EF1 and EF2 may be respectively provided to both sides of the silicon area IS. That is, the first and second SUS areas EF1 and EF2 may be arranged having the silicon area IS located therebetween.

Referring to FIG. 10, the SUS area EF may be molded to the silicon area IS through insert injection. That is, an insertion part IA of the SUS area EF may be molded to and integrated with the silicon area IS and an extended part EA of the SUS area EF may be located outside the silicon area IS. The elastic layer TS may be formed more easily by molding the SUS area EF to the silicon area IS through insert injection. Furthermore, the silicon area IS and the SUS area EF are not separated from each other even when the display assembly DA is repeatedly bent, maintaining reliability.

As shown in FIG. 11, the SUS area EF and the silicon area IS may be implemented in various forms.

Referring to FIG. 11(a), the silicon area IS may surround the SUS area EF. In other words, the silicon area IS is provided to four sides of the first and second SUS areas EF1 and EF2.

Referring to FIG. 11(b), the silicon area IS may cover the SUS area EF. In other words, the silicon area IS may surround the sides and both surfaces of the SUS area EF.

The elasticity of the elastic layer TS may increase as the area of the silicon area IS and/or the proportion of the silicon area IS increase. The restoring force applied by the elastic layer TS to the display assembly DA may increase as the area of the silicon area IS and/or the proportion of the silicon area IS increase.

Figure 12:
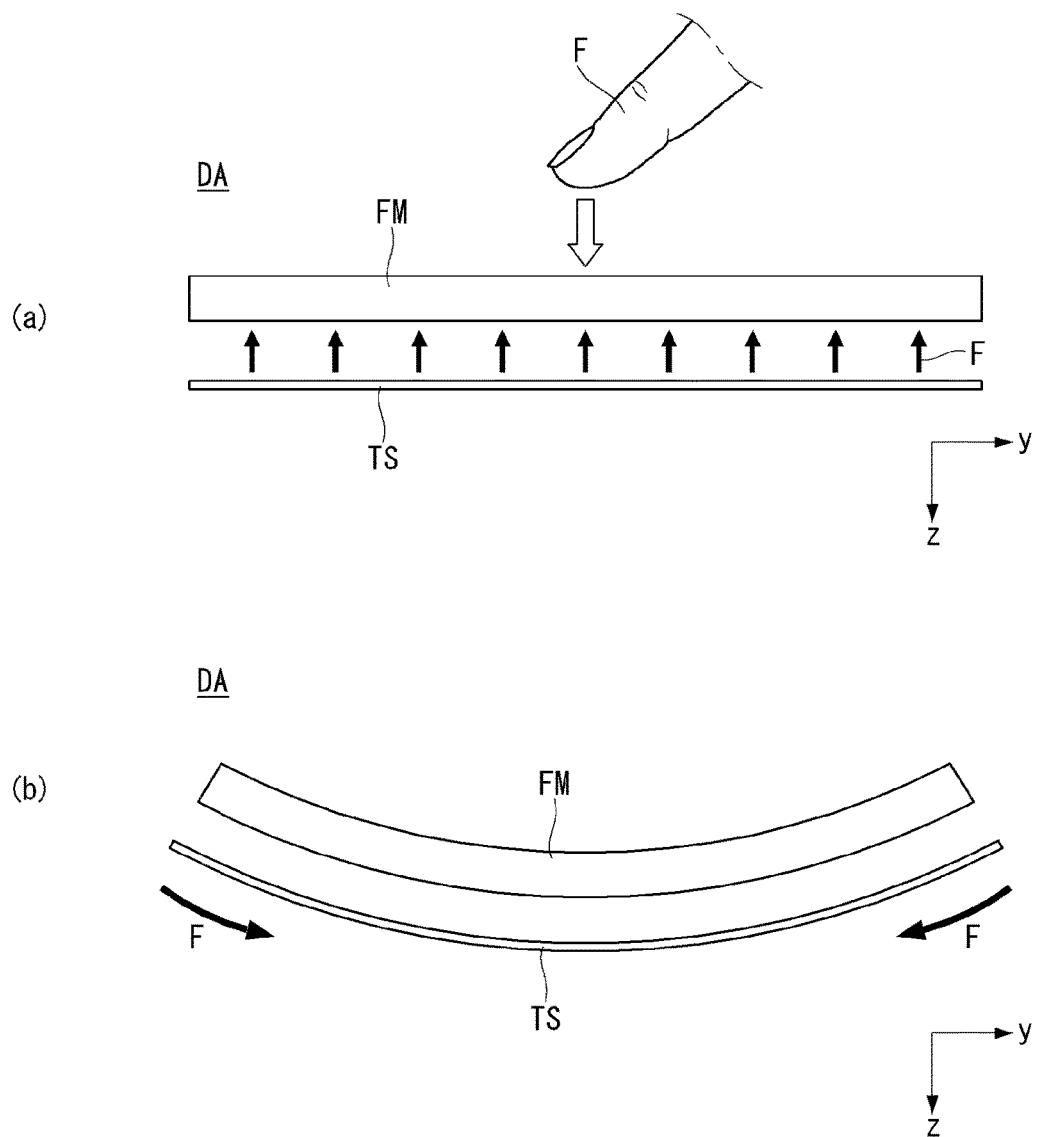
FIG. 12 illustrates the effects of an elastic layer according to an embodiment of the present invention.

FIG. 12 illustrates effects of the elastic layer according to an embodiment of the present invention.

As shown, the elastic layer TS may provide a supporting force and/or a restoring force for the display assembly DA. While the figure illustrates that the elastic layer TS is separated from a front module (FM) of the display assembly DA, this is a conceptual diagram for convenience of understanding. The elastic layer TS is attached to the front module FM.

Referring to FIG. 12(a), the user may touch the display assembly DA with a finger F or the like. When the user touches the display assembly DM, pressure may be applied to the touched point of the display assembly DA. The display assembly DA may include a flexible display panel. Accordingly, the touched region may be recessed when pressure is applied thereto.

The silicon area IS of the elastic layer TS may provide a restoring force in the thickness direction. Accordingly, a reaction force F to the pressure by the finger of the user may be provided to the display assembly to increase flatness of the display assembly DA.

The SUS area EF may prevent the display assembly DA from sagging. That is, the SUS area EF formed of a rigid material, as described above, can resist the pressure applied by the finger F.

Referring to FIG. 12(b), the display assembly DA may be bent. When the display assembly DA has been bent, the elastic layer TS may provide an elastic force to the display assembly DA. For example, a force can be applied in a direction in which the display assembly DA becomes flat due to the extended silicon area IS. That is, the flatness of the display assembly DA can be improved through the elastic layer TS.

Figure 13:
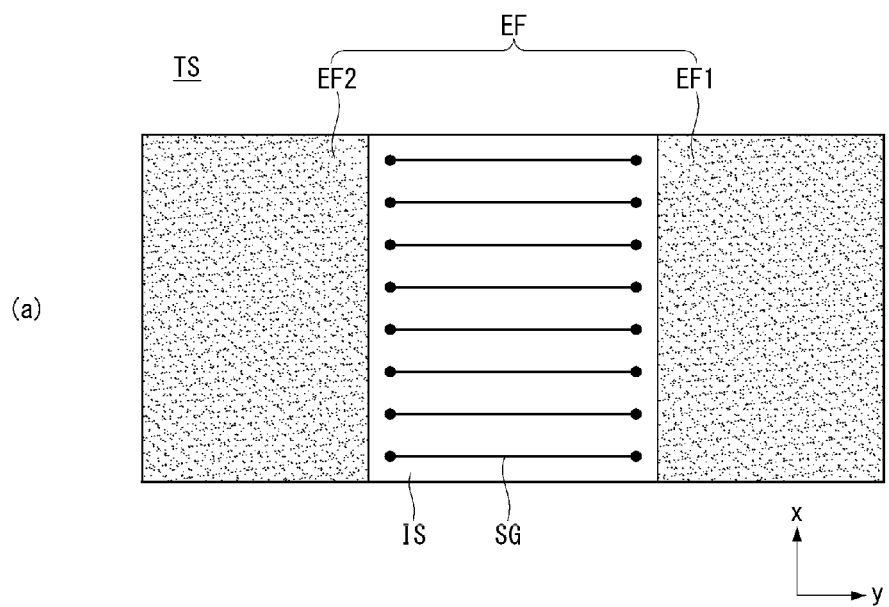
FIG. 13 illustrates strain gauges according to an embodiment of the present invention.
Figure 13:
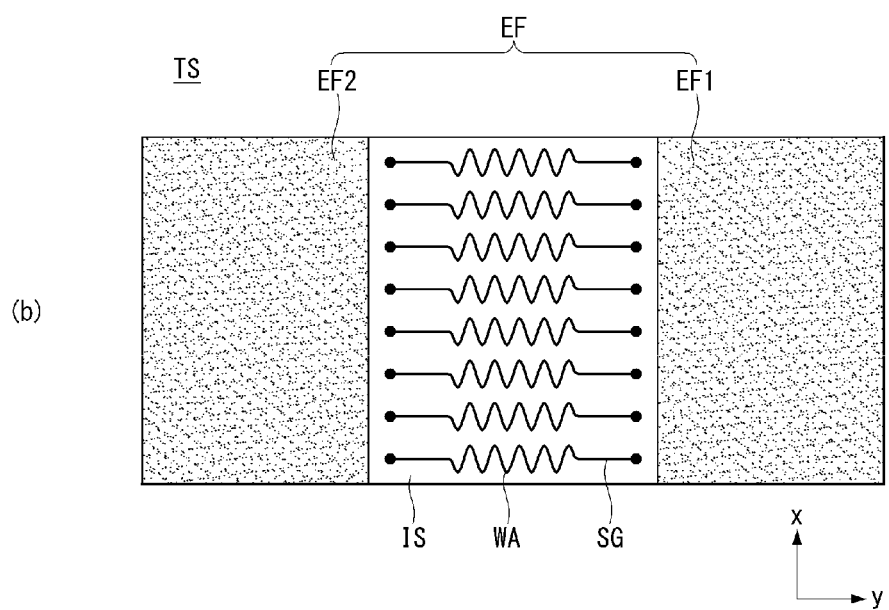

FIG. 13 illustrates a strain gauge according to an embodiment of the present invention.

As shown, strain gauges SG may be attached to the elastic layer TS according to the embodiment of the present invention. The strain gauges SG may sense a bending degree of the display assembly DA.

Referring to FIG. 13(a), the strain gauges SG may be provided to the silicon area IS. The strain gauges SG may be arranged in parallel with the longitudinal direction of the elastic layer TS. The strain gauges SG may be arranged at intervals.

The strain gauge SG may sense a bending degree of the elastic layer TS through a resistance variation. For example, when the elastic layer TS is bent, the length of the silicon area IS corresponding to the strain gauges SG may increase. When the length of the silicon area IS increases, the length of the strain gauges SG attached to the silicon area IS may also increase. Then, the thickness of the strain gauges SG may decrease. A length increase and a thickness decrease may cause an increase in the resistance of the strain gauges SG. A controller may sense a bending degree of the display assembly DA through a resistance increase/decrease of the strain gauges SG.

Referring to FIG. 13(b), the strain gauges SG may include a wrinkle area WA. The wrinkle area WA may be parts of the strain gauges SG that are not straight. The wrinkle area WA may increase the length of the strain gauges SG. That is, the wrinkle area WA may increase the length between the start point and the end point of each strain gauge SG. When the length of the strain gauges SG increases, the sensitivity of the strain gauges SG may increase. The wrinkle area WA may be located in the center area of the elastic layer TS, which has the largest bending degree.

Figure 14:
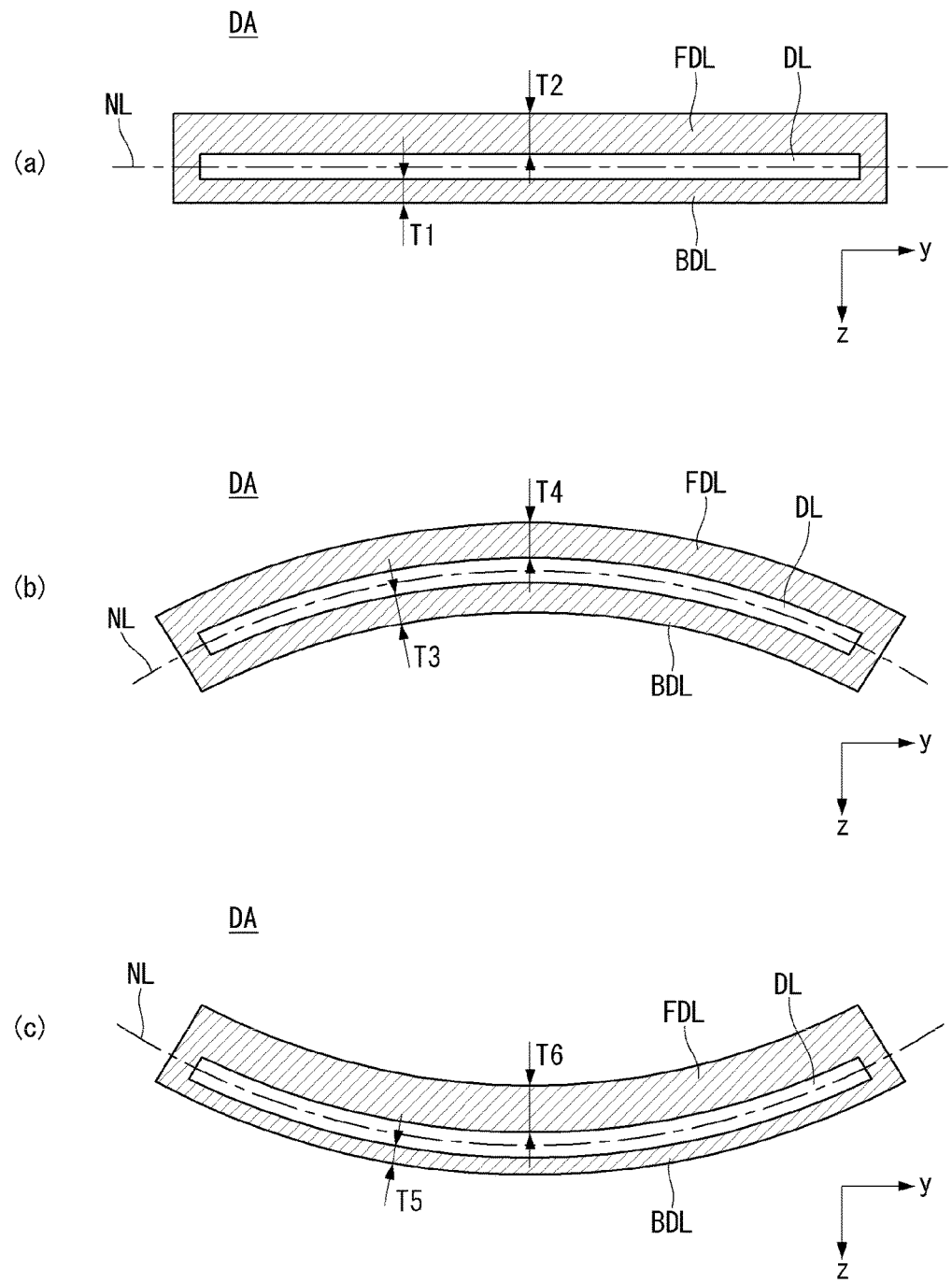
FIG. 14 illustrates bending states of a mobile terminal display assembly according to an embodiment of the present invention.

FIG. 14 illustrates bending states of the mobile terminal display assembly according to an embodiment of the present invention.

As shown, the display assembly DA according to an embodiment of the present invention may have the neutral surface NL formed in the display panel DL. Accordingly, stress applied to the display panel DL when the display panel DL is bent can be reduced.

Referring to FIG. 14(a), the display assembly DA may include a front layer FDL and a rear layer BDL having the display panel DL interposed therebetween. The front layer FDL may include the aforementioned first layer FL1, silicon layer SL1 and adhesive layer S and the rear layer BDL may include the second layer FL2. The front layer FDL and the rear layer BDL may have different thicknesses due to different layer configurations. For example, the rear layer BDL may have a first thickness T1, whereas the front layer FDL may have a second thickness T2. Even though the front layer FDL and the rear layer BDL have different thicknesses, the neutral surface NL may be located in the display panel DL. That is, it may be possible to arrange the neutral surface NL in the display panel DL by controlling the modulus of the layers forming the front layer FDL and the modulus of the layer forming the rear layer BDL.

Referring to FIGS. 14(b) and 14(c), the display assembly DA may be bent around the neutral surface NL in one direction or the other direction. For example, the thickness of the front layer FDL decreases from T2 to T4 and the thickness of the rear layer BDL increases from T1 to T3 when the display assembly DA is bent in one direction, whereas the thickness of the front layer FDL increases from T2 to T6 and the thickness of the rear layer BDL decreases from T1 to T5 when the display assembly DA is bent in the other direction.

Even though the thicknesses of the front layer FDL and the rear layer BDL change due to bending in one direction or the other direction, the display assembly DA can be bent around the neutral surface NL of the display panel DL. Accordingly, stress applied to the display panel DL according to bending can be minimized. That is, the effect of tensile force and/or compressive force according to bending is minimized in the display panel DL. This prevents the display panel DL from being damaged due to repeated expansion/compression.

FIGS. 15 to 19 illustrate a configuration of the mobile terminal display assembly according to an embodiment of the present invention.

As shown, the display assembly DA of the mobile terminal 100 according to an embodiment of the present invention may include a structure for effectively absorbing a change in the lengths of the inside/outside according to bending. The display assembly DA of the mobile terminal 100 according to an embodiment of the present invention may include a structure for effectively supporting the flexible display panel DL.

Figure 15:
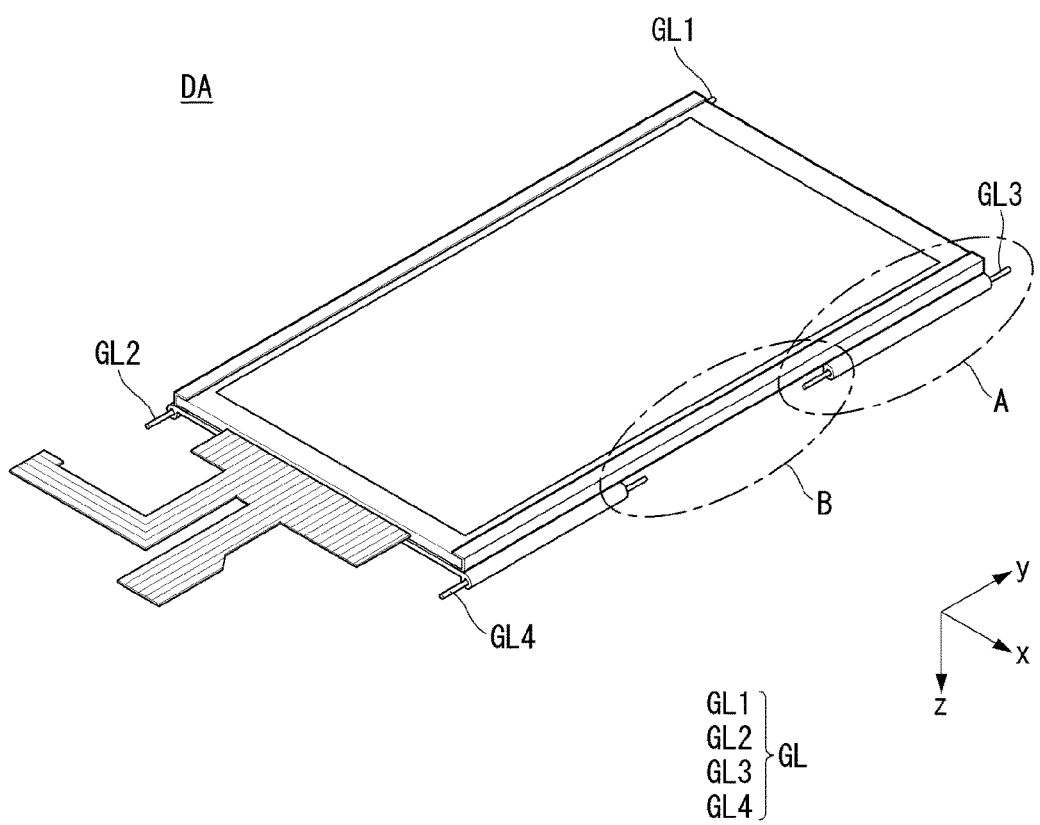
FIGS. 15 to 19 illustrate a configuration of the mobile terminal display assembly according to an embodiment of the present invention.

FIG. 15 is a front perspective view of the display assembly DA.

As shown, the display assembly DA may include guide rails GL.

The guide rails GL may be provided to long sides of the display assembly DA. The guide rails GL may be arranged at intervals. For example, the guide rails GL may include first and second guide rails GL1 and GL2 provided to one long side of the display assembly DA and third and fourth guide rails GL3 and GL4 provided to the other long side of the display assembly DA.

Figure 16:
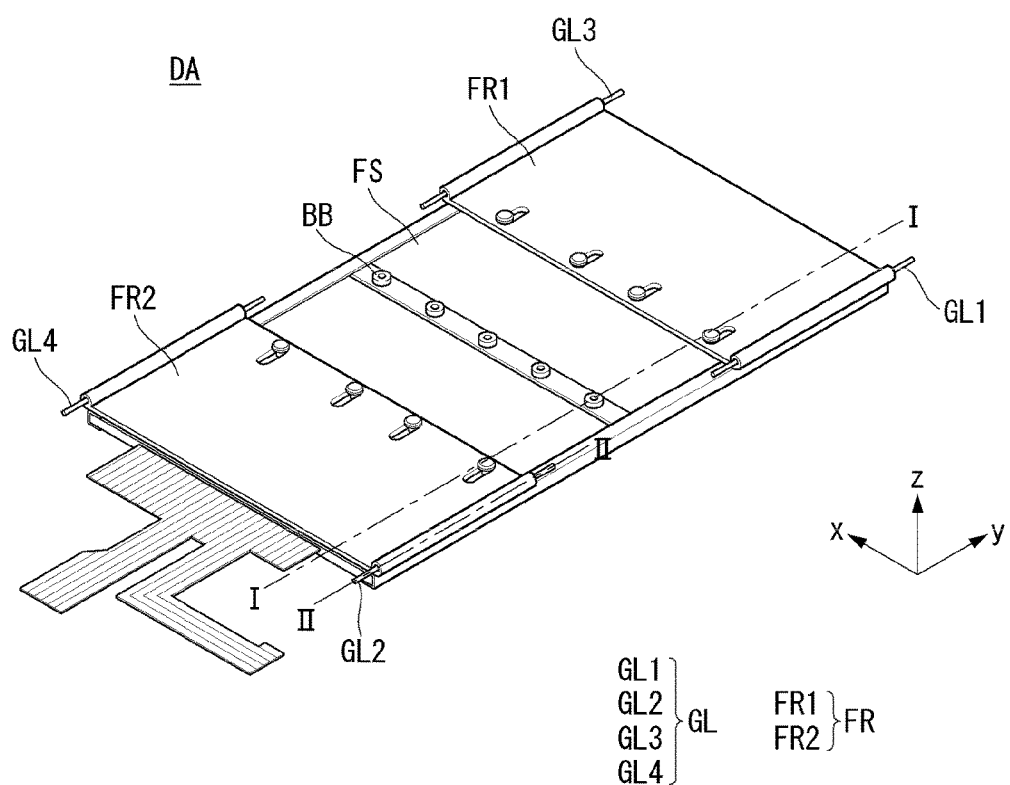

The guide rails GL may be combined with the frame (FR of FIG. 16). In other words, the display assembly DA and the frame (FR of FIG. 16) are combined. The display assembly DA and the frame (FR of FIG. 16) are combined through the guide rails GL. The guide rails GL may guide the display assembly DA such that the display assembly DA is bent in response to a bending direction and/or a bending degree of the mobile terminal 100.

FIG. 16 is a rear perspective view of the display assembly DA.

As shown, the display assembly DA may include a folding support FS provided between frames FR.

The frames FR may be rigid. That is, the frames FR may not be deformed even when an external force is applied thereto. The frames FR may be rigid plates. The frames FR may include first and second frames FR1 and FR2 spaced from each other.

The first and second frames FR1 and FR2 may be provided to both edges, in the longitudinal direction, of the rear side of the display assembly DA. In other words, the first and second frames FR1 and FR2 may be spaced a predetermined interval apart.

The first and second frames F1 and FR2 may be fixed to the display assembly DA. The first and second frames FR1 and FR2 may be fixed to the body (230 of FIG. 2) of the mobile terminal 100. In other words, one side of the first and second frames FR1 and FR2 may be fixed to the display assembly DA and the other side thereof may be fixed to the body (230 of FIG. 2).

The folding support FS may be positioned between the first and second frames FR1 and FR2. At least part of the folding support FS may overlap with the first and second frames FR1 and FR2 in the thickness direction of the mobile terminal 100.

The folding support FS may be flexible. Accordingly, bending of the display assembly DA may occur in the folding support FS between the first and second frames FR1 and FR2. A detailed configuration of the folding support FS will be described later. The folding support FS may include a connecting part BB provided to the center thereof.

One side of the connecting part BB may be connected with the display assembly DA and the other side thereof may be connected with the body (230 of FIG. 2). That is, the display assembly DA and the body (230 of FIG. 2) are combined through the connecting part BB.

The display assembly DA may be bent around the connecting part BB. That is, the flexible folding support FS may be bent around the connecting part BB.

FIG. 17(a) is an enlarged view of a portion A of the display assembly DA illustrated in FIG. 15. As shown, the third guide rail GL3 may be provided to one side of the frame FR. The third guide rail GL3 may include guide rails GL3a and GL3b respectively extended to one side and the other side thereof. The guide rails GL3a and GL3b of the third guide rail GL3 may be combined with the body.

FIG. 17(b) is an enlarged view of a portion B of the display assembly DA illustrated in FIG. 15. As shown, the guide rail GL3b of the third guide rail GL3 and a guide rail GL4b of the fourth guide rail GL4 may be spaced from each other. The spaced area between the guide rail GL3b of the third guide rail GL3 and the guide rail GL4b of the fourth guide rail GL4 may correspond to the bent area BA, that is, the area where the display assembly DA is bent.

Figure 18:
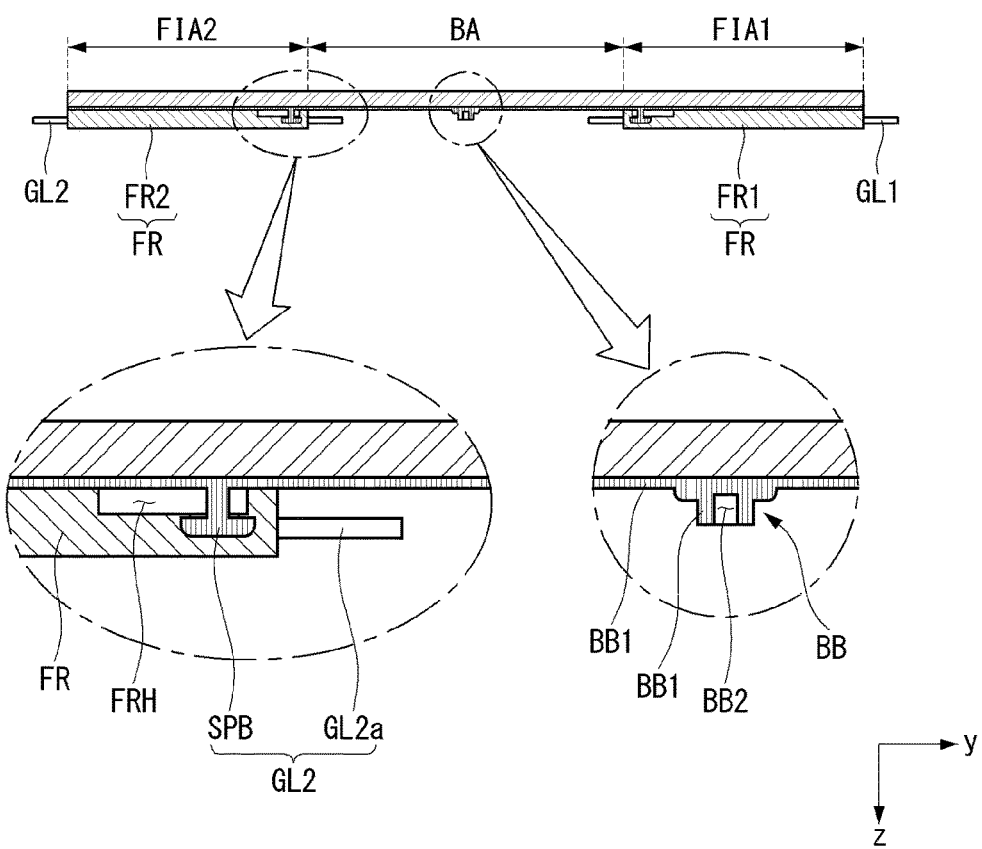

FIG. 18 is a cross-sectional view taken along line I-I of FIG. 16.

As shown, the connecting part BB is provided to the center of the display assembly DA and guide pins SPB are inserted into frame holes FRH of the frames FR provided to both sides of the display assembly DA.

The connecting part BB may include a body BB1 combined with the display assembly DA and a combining hole BB2 formed in the body BB1. The combining hole BB2 may be combined with a combining protrusion formed in the body of the mobile terminal 100.

The guide pins SPB may be extended from the folding support FS. The guide pins SPB may be inserted into the frame holes FRH. The guide pins SPB may move along the frame holes FRH. That is, the guide pins SPB can move along the frame holes FRH formed in the longitudinal direction of the mobile terminal 100.

Movement of the guide pins SPB may mean movement of the folding support FS combined with the guide pins SBP. That is, movement of the guide pins SBP can compensate for a difference between radiuses of rotation of the inside surface and the outside surface of the display assembly DA due to bending of the display assembly DA.

The display assembly DA may include the bent area BA and fixed areas FIA1 and FIA2. The display assembly DA may be bent in the bent area BA.

Figure 19:
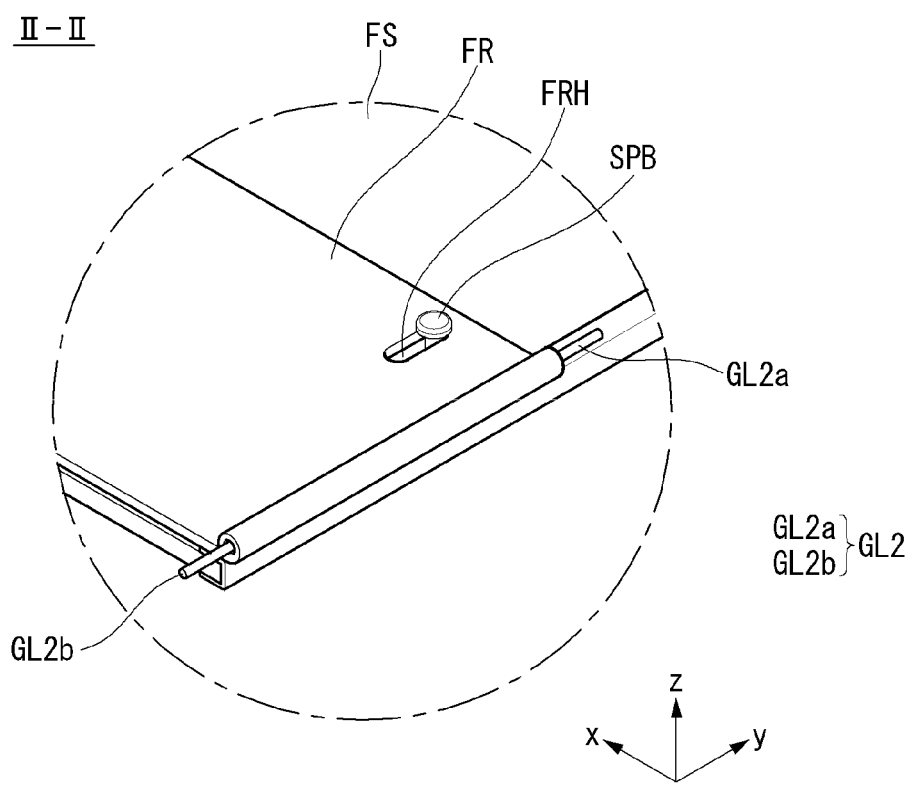
Figure 20:
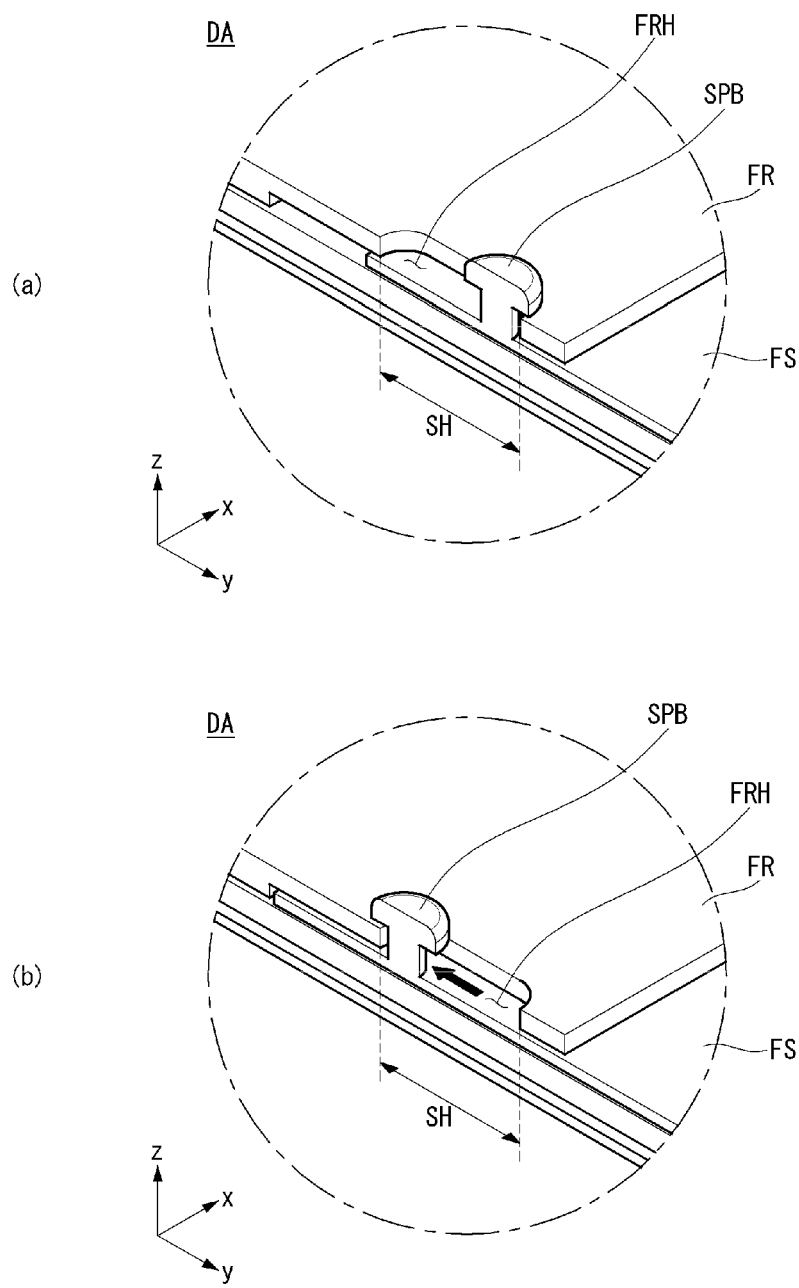
FIGS. 20 to 23 illustrate operations of the mobile terminal display assembly according to an embodiment of the present invention.

FIG. 19 is a cross-sectional view taken along line II-II of FIG. 16.

As shown, the second guide rail GL2 may be combined with the frame FR. Guide rails GL2a and GL2b of the second guide rail GL2 may be extended to both ends thereof and combined with the body of the mobile terminal.

The folding support FS may support the display assembly DA from the rear side of the display assembly DA. The folding support FS may slide to compensate for length variation of the display assembly DA due to bending of the display assembly DA.

FIGS. 20 to 23 illustrate operation of the mobile terminal display assembly according to an embodiment of the present invention.

As shown, the folding support FS supporting the display assembly DA may slide to compensate for a length difference between the inside surface and the outside surface of the display assembly DA due to bending of the display assembly DA.

Referring to FIG. 20(a), the guide pin SPB may be positioned at one side of the frame hole FRH at an initial position. The initial position may correspond to a state in which the mobile terminal is unfolded. The frame hole FRH may be a slit having a long side SH. The frame hole FRH may be a slit formed in parallel with the length of the display assembly DA.

Referring to FIG. 20(b), the guide pin SPB may be positioned at the other side of the frame hole FRH at a changed position. The changed position may correspond to a state in which the mobile terminal 100 is folded. That is, the guide pin SPB may gradually move from one side to the other side of the frame hone FRH during changing from the initial position to the changed position. Since the guide pin SPB is combined with the folding support FS, movement of the guide pin SPB may mean movement of the folding support FS.

Figure 21:
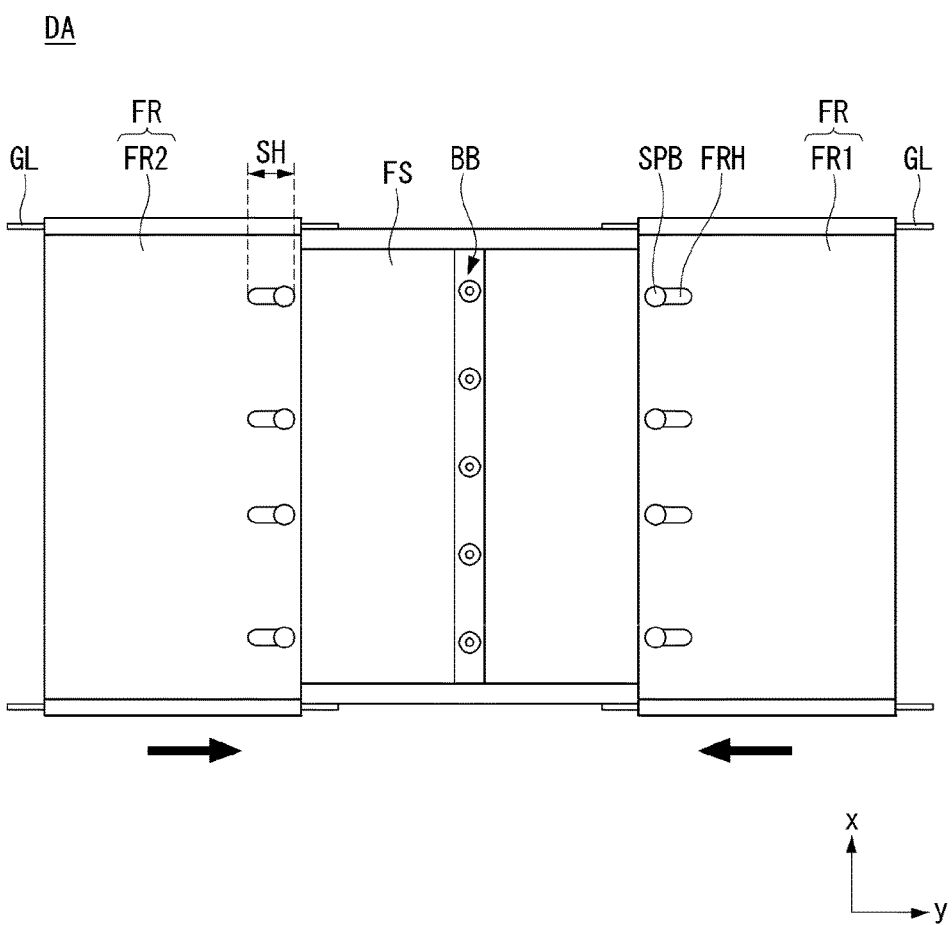
Figure 22:
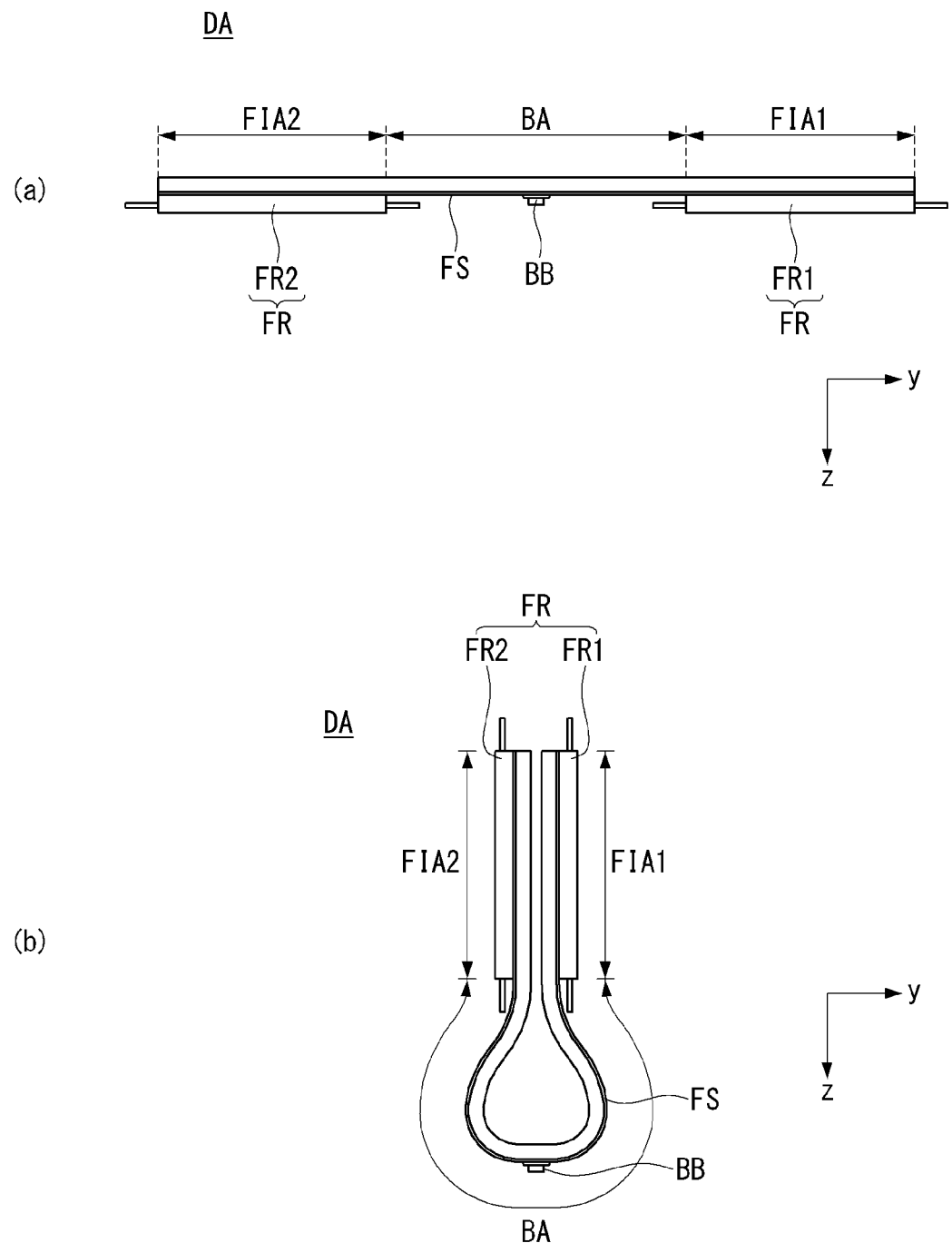

FIG. 21 illustrates the rear side of the display assembly DA.

As shown, the first and second frames FR1 and FR2 may have the frame holes FRH. For example, the frame holes FRH may be arranged in a line being spaced at intervals in the first and second frames FR1 and FR2.

The guide pins SPB may be inserted into the frame holes FRH. Accordingly, the guide pins SPB may be moved by a distance corresponding to the length of the long side of the frame holes FRH. Since the first and second frames FR1 and FR2 respectively have the frame holes FRH, a length variation in the inside surface/outside surface of the display assembly DA due to bending of the display assembly DA can be offset by twice the length of the long side SH of the frame holes FRH.

Referring to FIG. 22(a), the folding support FS and the first and second frames FR1 and FR2 can support the display assembly DA in a state in which the display assembly DA is unfolded. That is, the unfolded state of the display assembly DA can be maintained such that the display assembly DA can remain flat without being wrinkled.

Referring to FIG. 22(b), the display assembly DA may be bent in the area of the folding support FS. That is, the bent area BA corresponding to the folding support FS can be bent. This means that the first and second frames FR1 and FR2 may not be bent even when the display assembly DA is bent.

Figure 23:
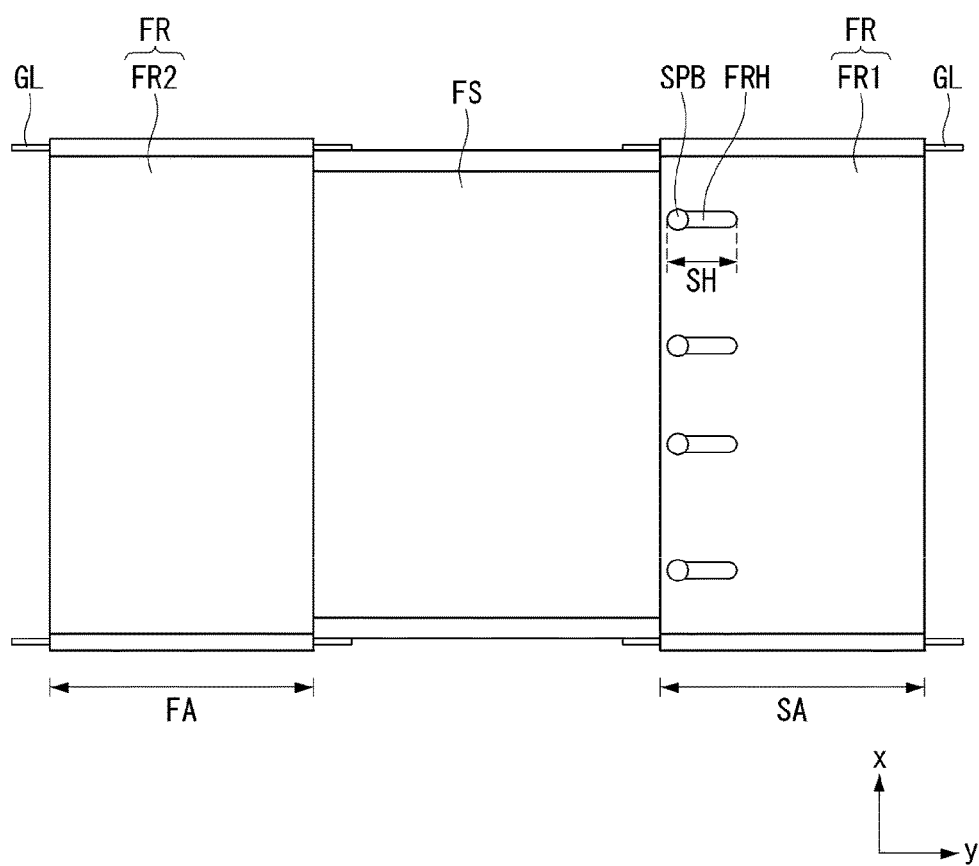

FIG. 23 illustrates a display assembly DA according to another embodiment of the present invention.

The second frame FR2 may be coupled to the body of the mobile terminal 100. That is, the second frame FR2 may be a fixed area FA. The second frame FR2 may serve as a fixed area FA connected to the body of the mobile terminal to allow the connecting part (BB of FIG. 22) in the aforementioned embodiment to be omitted.

The frame holes FRH may be provided to only one of the first and second frames FR1 and FR2. For example, the frame holes FRH may be provided to the first frame FR1. Accordingly, the folding support FS may slide along the frame holes FRH of the first frame FR1 to offset length variation of the display assembly DA when the display assembly DA is bent.

Figure 24:
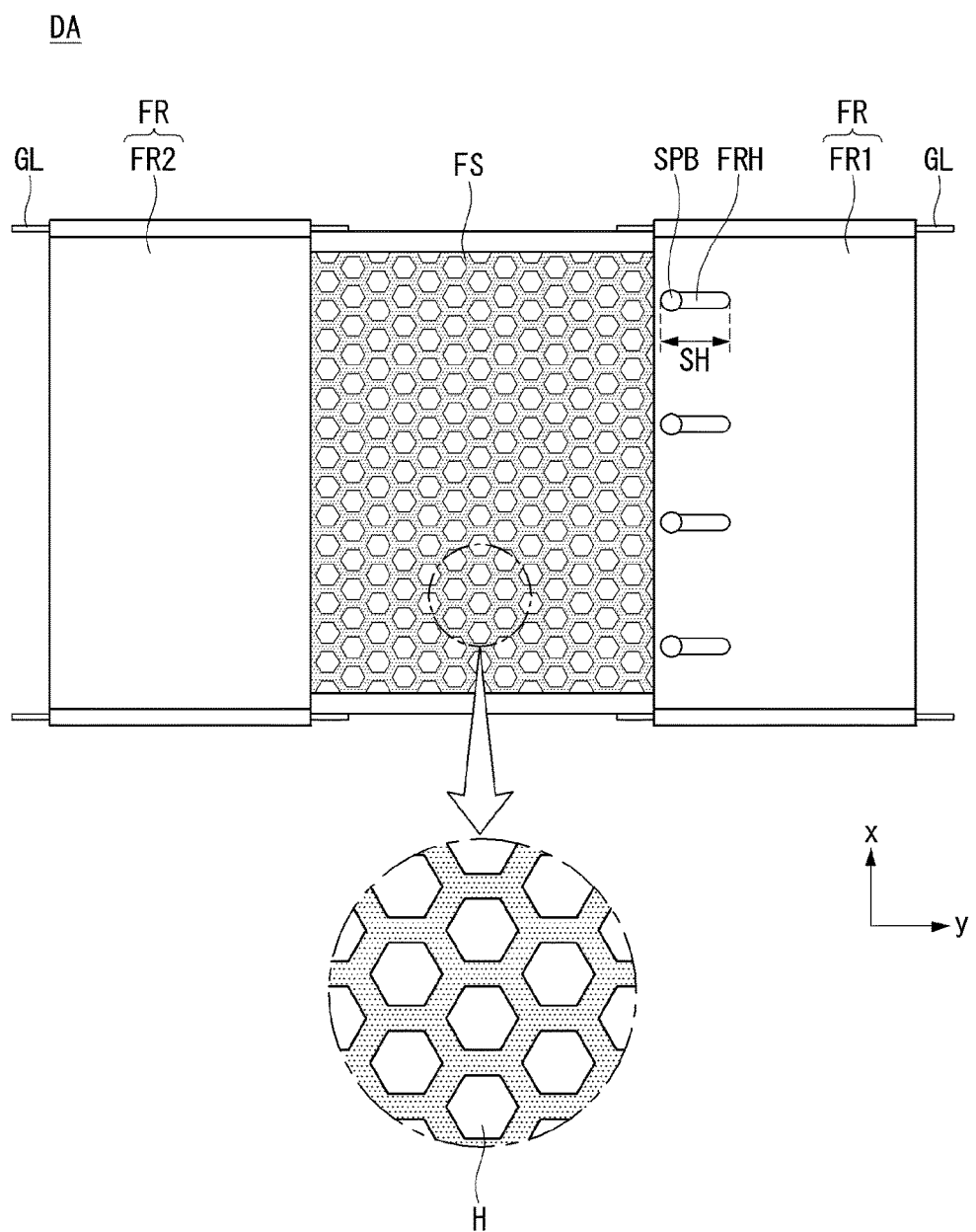
FIGS. 24 and 25 illustrate a configuration of the mobile terminal display assembly according to an embodiment of the present invention.
Figure 25:
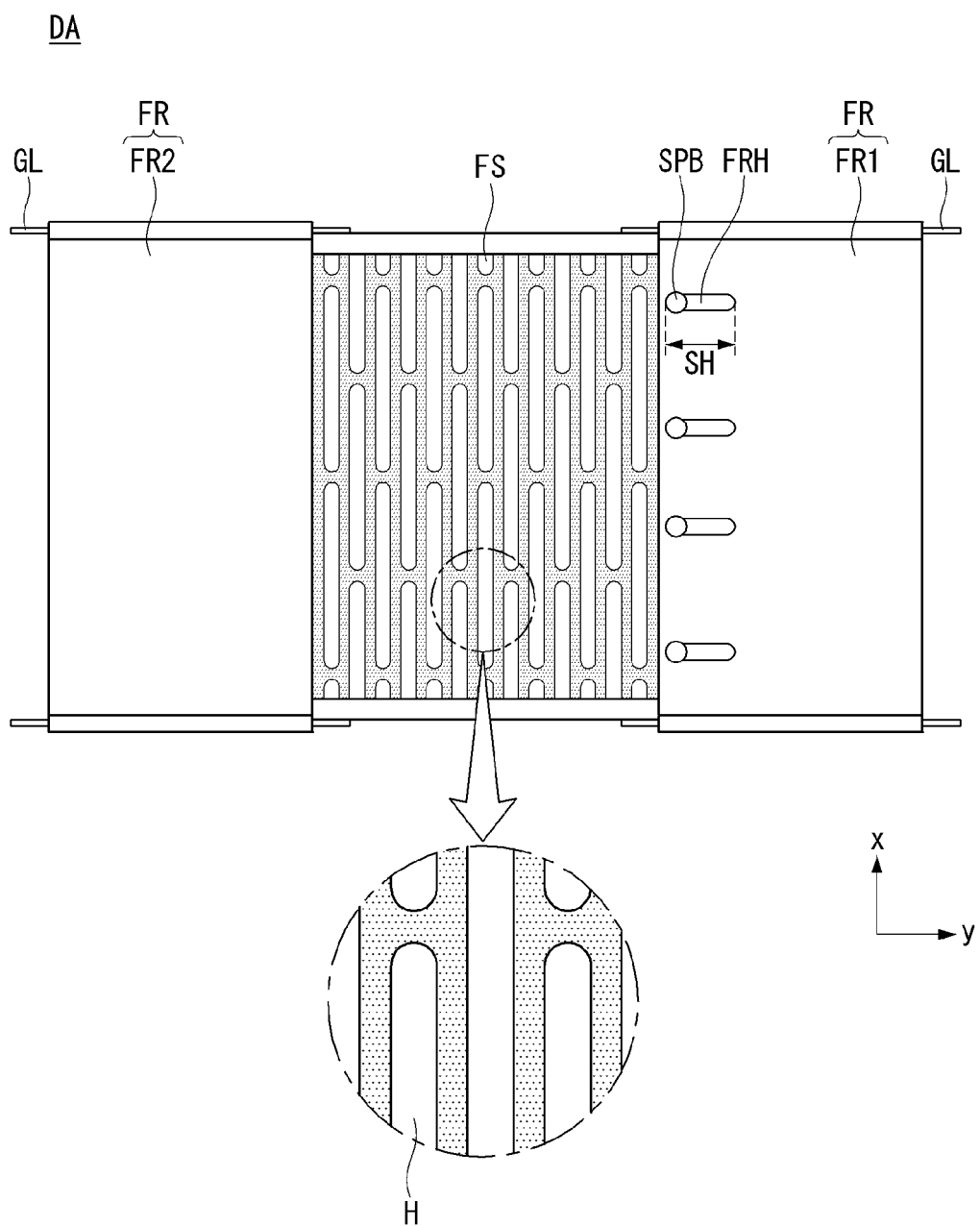

FIGS. 24 and 25 illustrate configurations of the mobile terminal display assembly according to an embodiment of the present invention.

As shown, the display assembly DA according to an embodiment of the present invention may use the folding support FS in various forms for bending and support effects.

Referring to FIG. 24, the folding support FS may have a plurality of holes formed therein.

The holes H may be arranged at intervals. The holes H may have a polygonal shape. For example, the folding support FS may have hexagonal holes H.

The holes H may enable more flexible bending of the folding support FS. That is, since the silicon forming the folding support FS is not present in the holes H, resistance to bending can be reduced in the holes H.

Despite presence of the holes H, the capability of the folding support FS to support the display assembly DA may not be changed. That is, the supporting force of the folding support FS in the thickness direction of the display assembly DA can be maintained due to the honeycomb-like structure of the folding support FS.

Referring to FIG. 25, the holes H may be slits. That is, the holes H having long sides in the width direction of the display assembly DA may be arranged in a line. In this case, resistance to bending may be reduced compared to the aforementioned embodiment. Accordingly, more flexible bending can be achieved.

Figure 26:
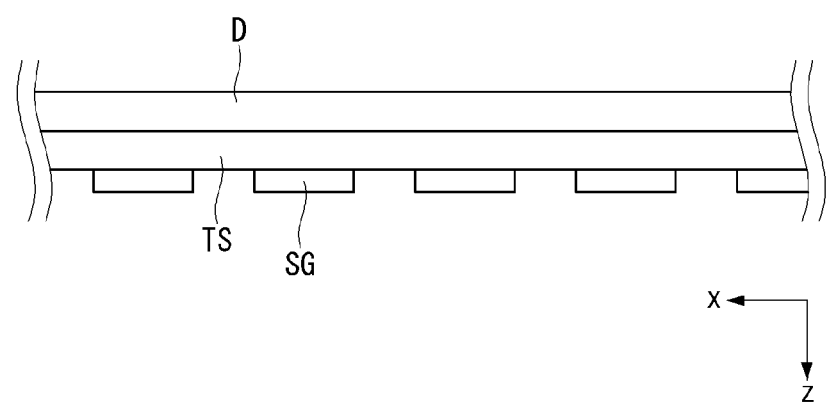
FIGS. 26 to 28 are cross-sectional views illustrating the configuration of the mobile terminal according to the present invention.
Figure 27:
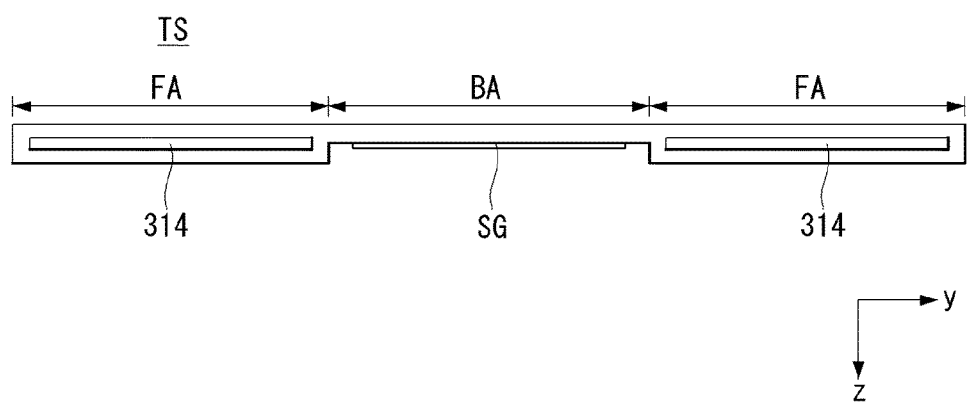
Figure 28:
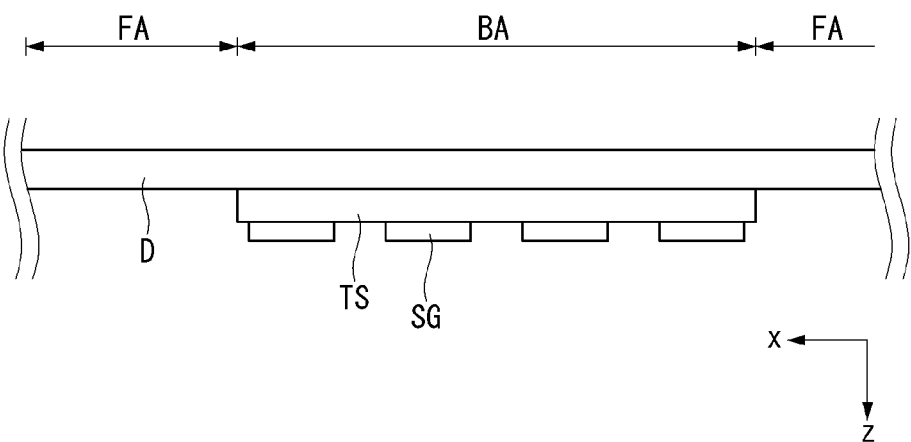
Figure 28:
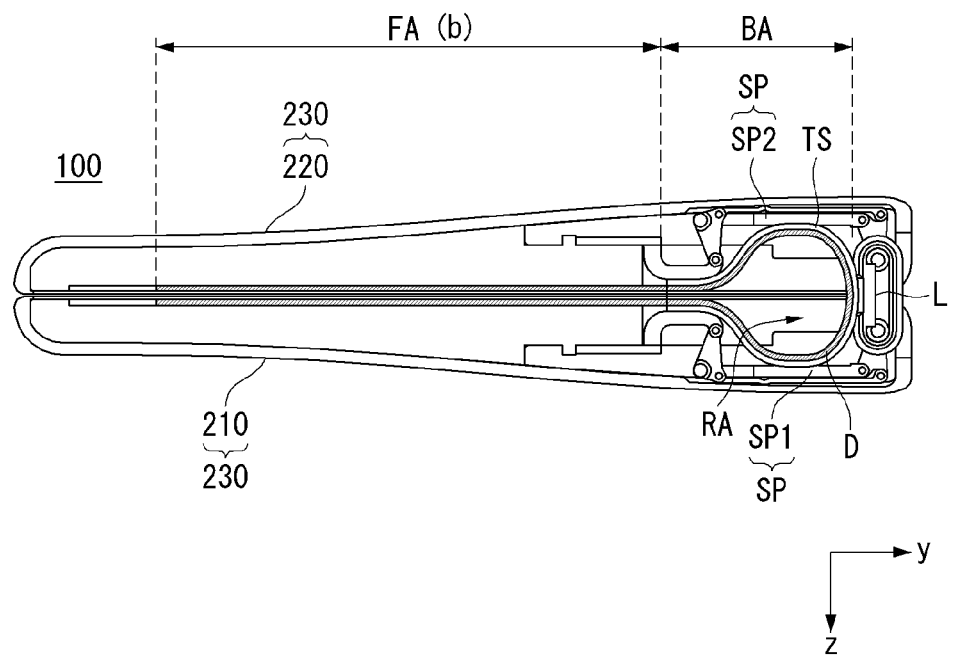

FIGS. 26 to 28 are cross-sectional views illustrating a configuration of the mobile terminal according to the present invention.

Referring to FIG. 26, the strain gauges SG may be provided to at least part of at least one side of the elastic layer TS. At least one strain gauge SG may be provided on the elastic layer TS and spaced from other strain gauges SG. The at least one strain gauge SG may be extended from one edge of the elastic layer TS to the other edge thereof. The strain gauge SG may contain a conductive material.

Since the strain gauge SG contains a conductive material, the resistance of the strain gauge SG can be measured by electrically connecting both ends thereof. A state change of the mobile terminal may be sensed through resistance variation in the strain gauge SG. The resistance variation in the strain gauge SG will be described in detail below.

Referring to FIG. 27, a portion of the elastic layer TS, which corresponds to the flat area FA, may include a stainless steel plate 314 inserted into the silicon. For example, the stainless steel plate 314 may be formed through insert injection inside of the silicon. That is, the stainless steel plate may be integrated with the silicon. The stainless steel plate 314 can improve flatness of the display D to be attached thereto.

The strain gauge SG may be present in the bent area BA. For example, the strain gauge SG may be provided to the side of the elastic layer TS, opposite the side contacting the display D.

Referring to FIG. 28(a), the elastic layer TS may be attached to at least part of at least one side of the display D. That is, the elastic layer TS may be provided only on the bent area BA of the display D.

Figure 29:
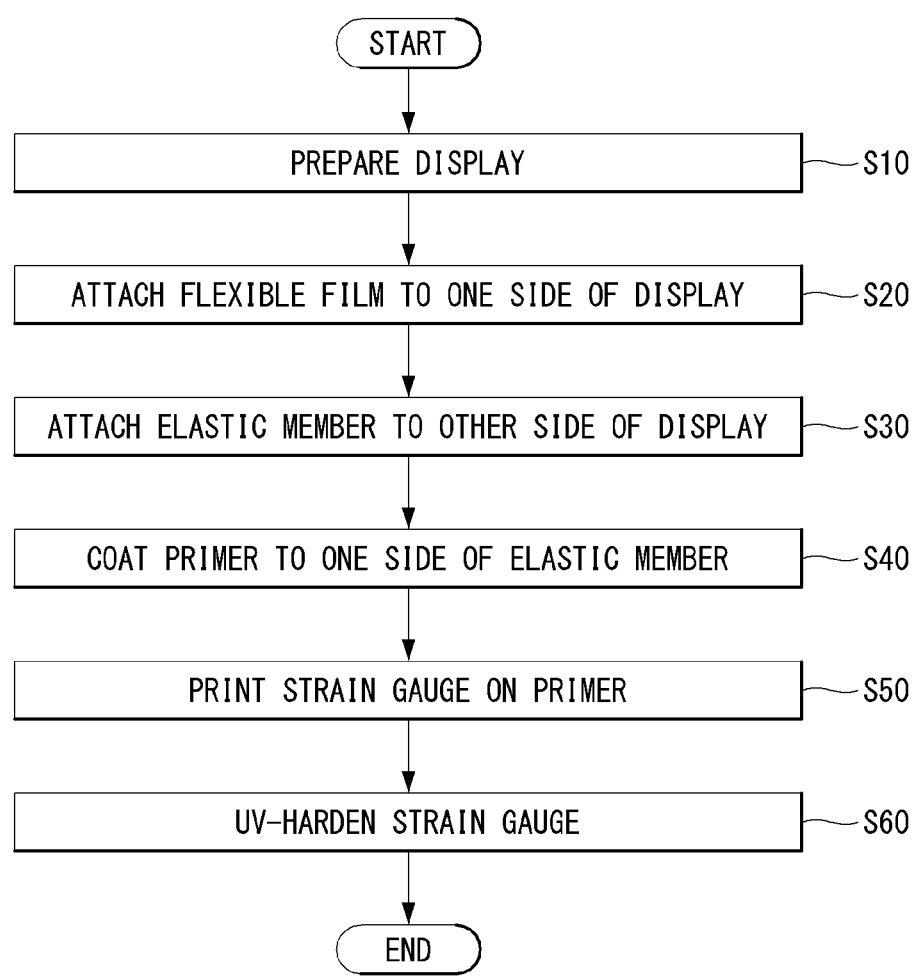
FIG. 29 is a flowchart illustrating a mobile terminal manufacturing method according to the present invention.

Referring to FIG. 28(b), during changing from the first state to the second state or vice versa, only the bent area BA of the display D may be recessed or bent. Accordingly, even if the elastic layer TS is provided only to the bent area BA, the display D can be prevented from being damaged or wrinkled. FIG. 29 is a flowchart illustrating a method of manufacturing the mobile terminal according to the present invention and FIGS. 30 to 37 are cross-sectional views sequentially illustrating the mobile terminal manufacturing method according to the present invention.

As illustrated in FIGS. 29 to 37, the mobile terminal manufacturing method according to the present invention may include the following steps.

Figure 30:
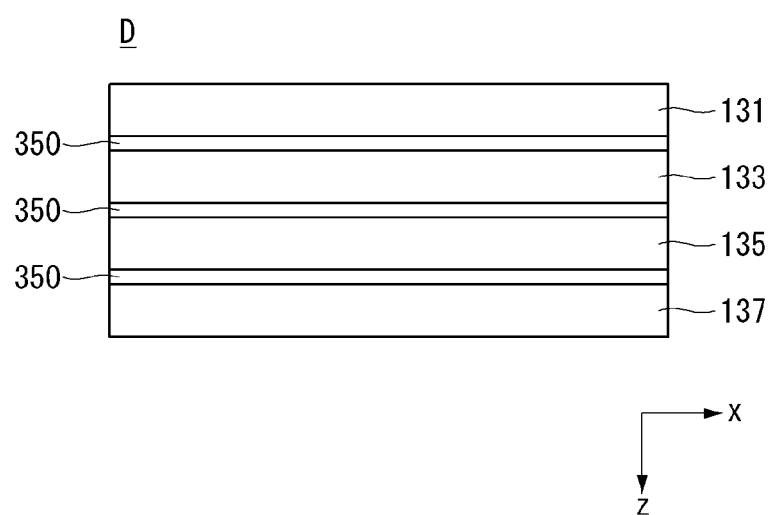
FIGS. 30 to 37 are cross-sectional views sequentially illustrating the mobile terminal manufacturing method according to the present invention.

Referring to FIG. 30, the display D may be prepared (S10). The display D may include foam 137, a TFT substrate 135, a touch substrate 133 and a polarizer 131, which are sequentially laminated. An adhesive layer 350 may be interposed between the laminated layers.

The polarizer 131 may change natural light input thereto vibrating in various directions into light vibrating in one direction. Accordingly, the polarizer can secure outdoor visibility by preventing incident light from being reflected.

The touch substrate 133 may be positioned under the polarizer 131. The touch substrate 133 may senses user touch. The touch substrate 133 may be a transparent indium tin oxide (ITO) glass substrate. The touch substrate 133 may include a plurality of sensing layers crossing each other. Accordingly, the touch substrate 133 can correctly sense a point touched by the user. The touch substrate 133 may be a resistive touch substrate or a capacitive touch substrate.

The TFT substrate 135 may be positioned under the touch substrate 133. The TFT substrate 135 may adjust an image to be displayed on the display D. The TFT substrate 135 may include data lines and gate lines, which intersect each other, TFTs formed at intersections of the data lines and the gate lines, and pixel electrodes disposed in regions formed by the data lines and the gate lines.

The foam 137 may be positioned under the TFT substrate 135. The foam 137 may have a porous structure or a sponge-like structure. The foam 137 may absorb part of the adhesive layer 350. Accordingly, when the adhesive layer 350 is excessively provided, the foam 137 can prevent the adhesive layer 350 from overflowing. The foam 137 may be compressed at a predetermined rate since the foam 137 has a porous structure. Accordingly, the foam 137 may be closely attached to the TFT substrate 135 more effectively. The foam 137 may include at least one of acrylate resin, polyester resin, cellulose resin and polyolefin resin.

The adhesive layer 350 may be disposed between the aforementioned layers and aid in combining the layers. The adhesive layer 350 may include an optical clear adhesive (OCA) or an optical clear resin (OCR).

The adhesive layer 350 may be hardened into a solid state by applying ultraviolet light having an appropriate wavelength thereto. That is, the multiple layers of the display D may be simultaneously heated and pressed to be hardened.

Figure 31:
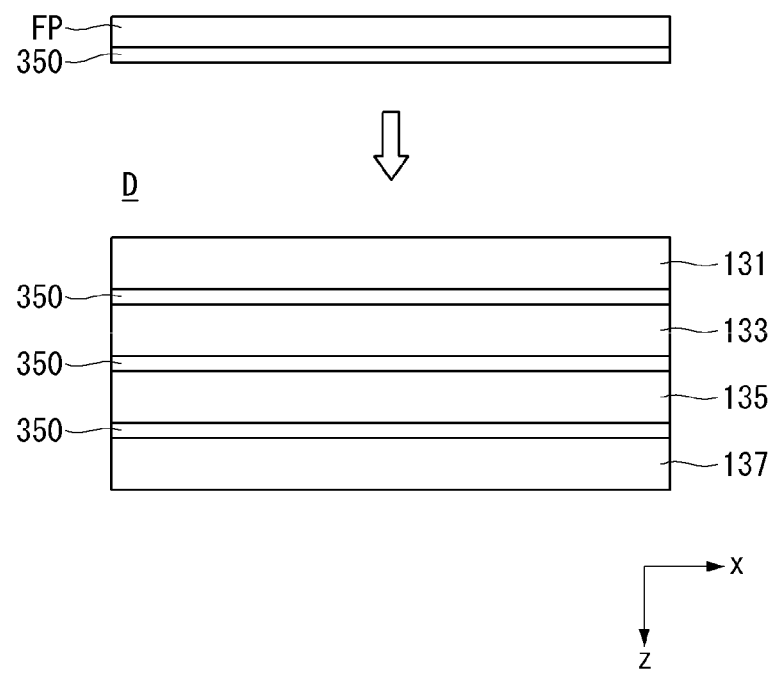

Referring to FIG. 31, a flexible film FP may be attached to one side of the display D (S20). Specifically, the flexible film FP may be attached to the upper surface of the polarizer 131 of the display D through the adhesive layer 350. The flexible film FP may protect the display D from external impact or moisture. In addition, the flexible film FP may prevent the display D from being cracked even if the display D is repeatedly bent.

Figure 32:
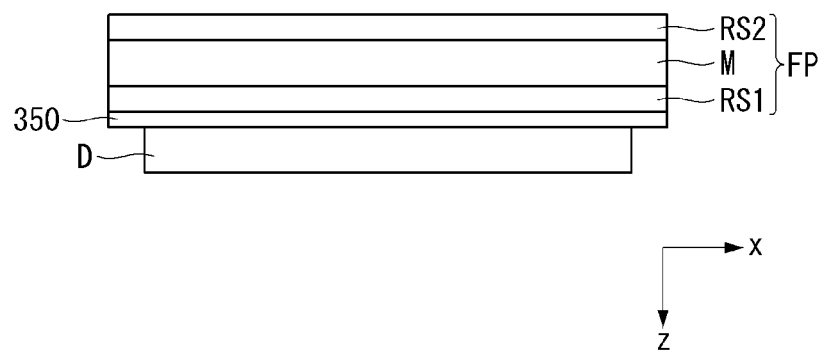

As shown in FIG. 32, in the mobile terminal according to an embodiment of the present invention, the flexible film FP may include a body M and first and second buffer layers RS1 and RS2. The first and second buffer layers RS1 and RS2 may be respectively provided to both sides of the body M. The first and second buffer layers RS1 and RS2 may be opposite each other with the body M interposed therebetween.

The body M may include silicon. For example, the body M may have a thickness in the range of 0.1 mm to 0.4 mm. The body M can be flexible during changing from the first state to the second state since the body M contains silicon.

The first and second buffer layers RS1 and RS2 may include materials having a different modulus from the body M. For example, the first buffer layer RS1 may include a material having a lower modulus than the body M whereas the second buffer layer RS2 may include a material having a higher modulus than the body M. Accordingly, elasticity may gradually increase from the display D to the body M.

Elasticity between the display D and the body M may not be abruptly changed due to the presence of the first and second buffer layers RS1 and RS2. Accordingly, the first and second buffer layers RS1 and RS2 may prevent generation of cracks at the boundary between the body M and the display D.

According to the present embodiment, the adhesive layer 350 may attach the flexible film FP to the display D using an optical clear adhesive (OCA) or an optical clear resin (OCR).

Figure 33:
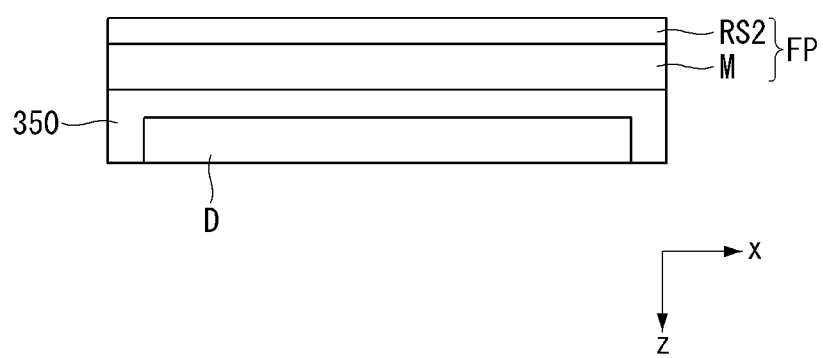

Referring to FIG. 33, in a mobile terminal according to another embodiment of the present invention, the flexible film FP may include the body M and only the second buffer layer RS2.

According to the present embodiment, the adhesive layer 350 may cover the front surface and the side of the display D. That is, the adhesive layer 350 may seal the front surface and the side of the display D. In this case, the adhesive layer 350 may use an OCR.

The adhesive layer 350 may use a silicon OCR. The silicon OCR may have a modulus in the range of 8,000 Pa to 10,000 Pa. In addition, 80% or more of the silicon OCR may have elasticity. Accordingly, the silicon OCR may absorb stress caused by length variation of the flexible film FP and the display D during changing from the first state to the second state and assist in promoting changing from the second state to the first state when the mobile terminal changes from the second state to the first state. Furthermore, since the OCR covers the side of the display D as well as the front surface thereof, an air gap is removed, preventing diffuse reflection.

The OCR may not require a buffer layer for buffering elasticity between the display D and the body M since the OCR has higher elasticity than the OCA. Accordingly, only the second buffer layer RS2 may be provided to the lower surface of the flexible film FP according to the present embodiment.

In the case of the mobile terminal according to the present embodiment, the user can view the display D having high picture quality without diffuse reflection using the OCR as the adhesive layer 350, and a buffer layer is not needed between the display D and the body M, reducing manufacturing costs.

Figure 34:
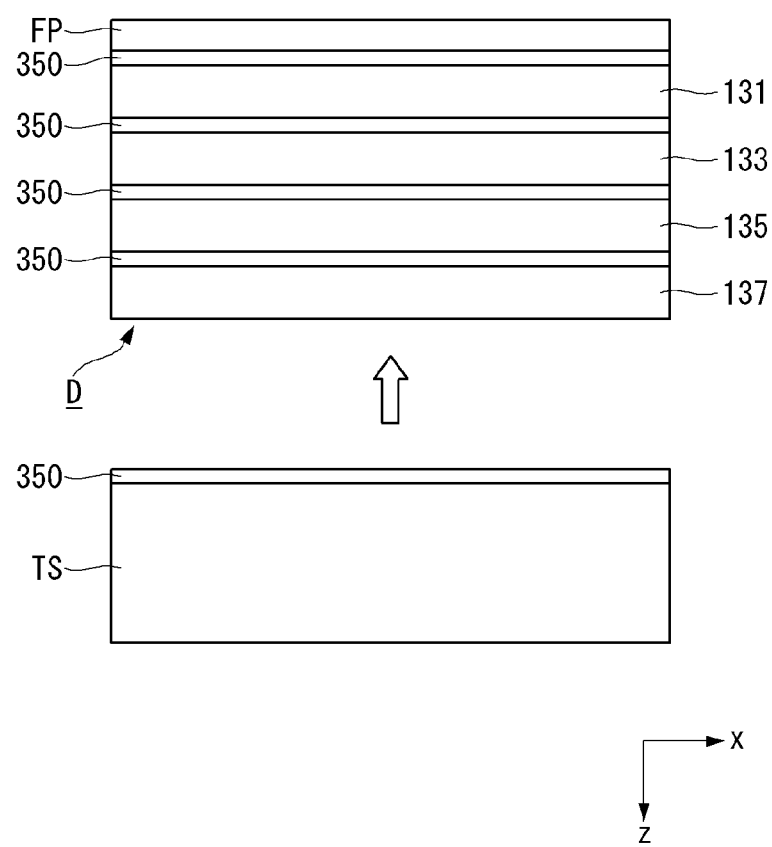

Referring to FIG. 34, an elastic member TS may be attached to the other side of the display D (S30). Specifically, the elastic member TS may be attached to the lower surface of the foam 137 through the adhesive layer 350. The foam 137 may prevent the material of the elastic member TS from infiltrating the TFT substrate 135.

Upon attachment of the elastic member TS to the display D, the plurality of layers may be hardened by being simultaneously heated and pressed.

Figure 35:
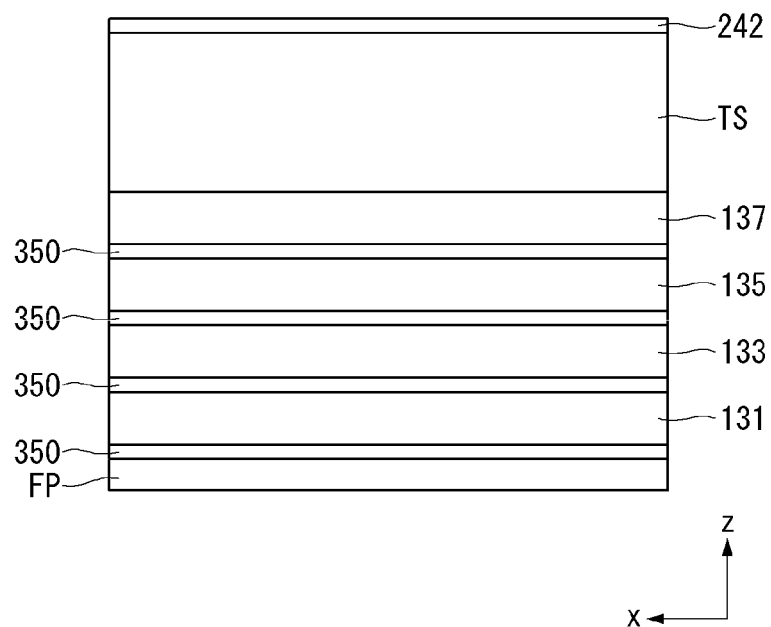

Referring to FIG. 35, a primer 242 may be coated on one side of the elastic member TS (S40). The primer 242 may assist in attaching a strain gauge, which will be described below, to the elastic member TS. The primer 242 may be formed by mixing a thermoplastic polyurethane resin, a chlorinated polyolefin resin, an adhesion promoter, a silane coupling agent and various types of mixed solvents.

Figure 36:
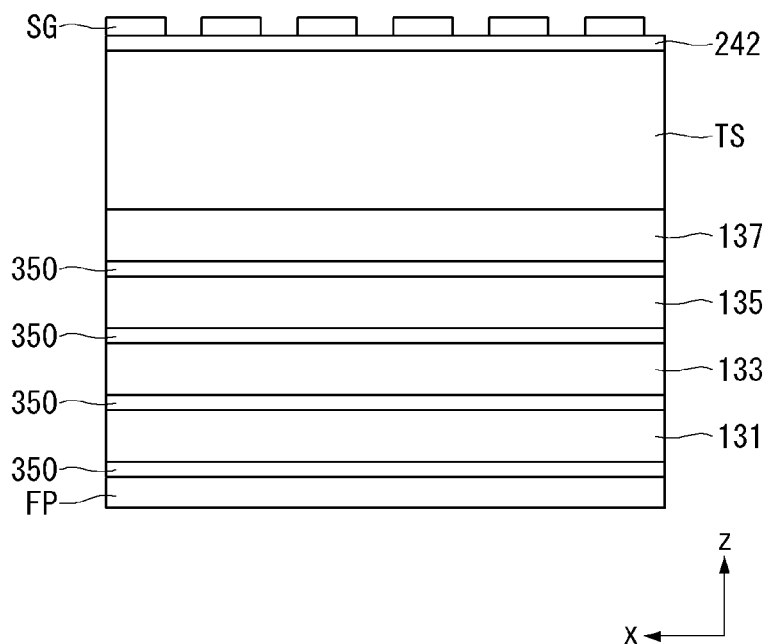

Referring to FIG. 36, the strain gauge SG may be printed on the elastic member TS on which the primer 242 is coated (S50). At least one strain gauge SG may be printed in a predetermined pattern on the elastic member TS. The at least one strain gauge SG may be separated from another strain gauge ST. Since the strain gauge SG includes a conductive material, resistance of the at least one strain gauge SG can be measured by electrically connecting both ends of the strain gauge SG.

Figure 37:
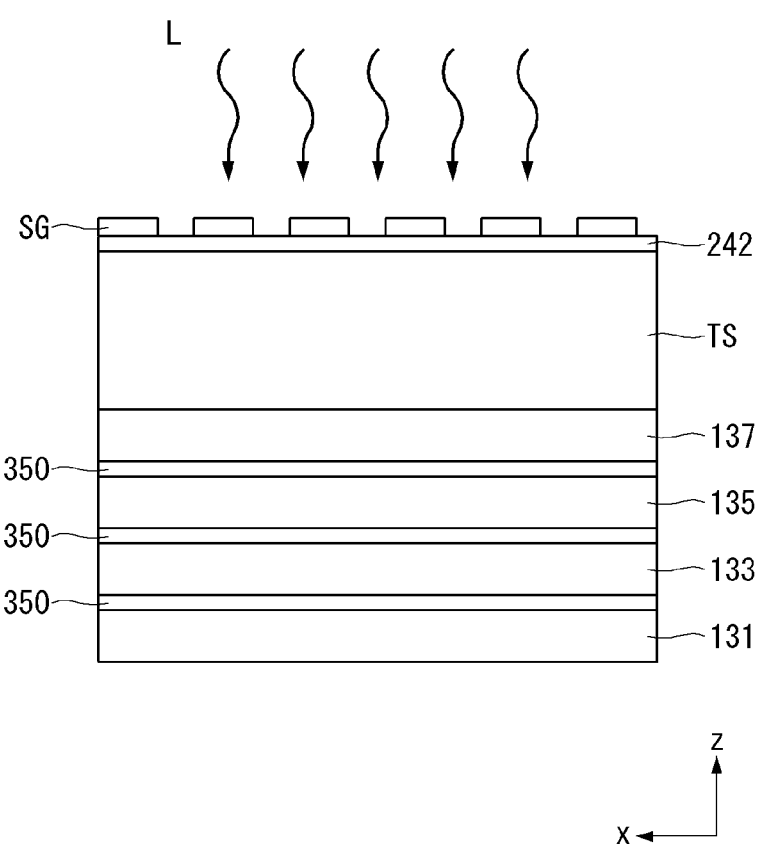

Finally, referring to FIG. 37, the strain gauge SG may be hardened (S60). Ultraviolet light is projected onto the strain gauge SG immediately after the strain gauge SG is printed on the elastic member TS to harden the strain gauge SG. For example, an ultraviolet ramp may move simultaneously with a machine that prints the strain gauge SG to emit ultraviolet ray to the strain gauge SG. Accordingly, the strain gauge SG is hardened before being dispersed and spread on the surface of the elastic member TS, and thus the strain gauge SG can be formed to a sufficient height. Furthermore, the surface of the elastic member TS can be prevented from being contaminated by the strain gauge SG.

Figure 38:
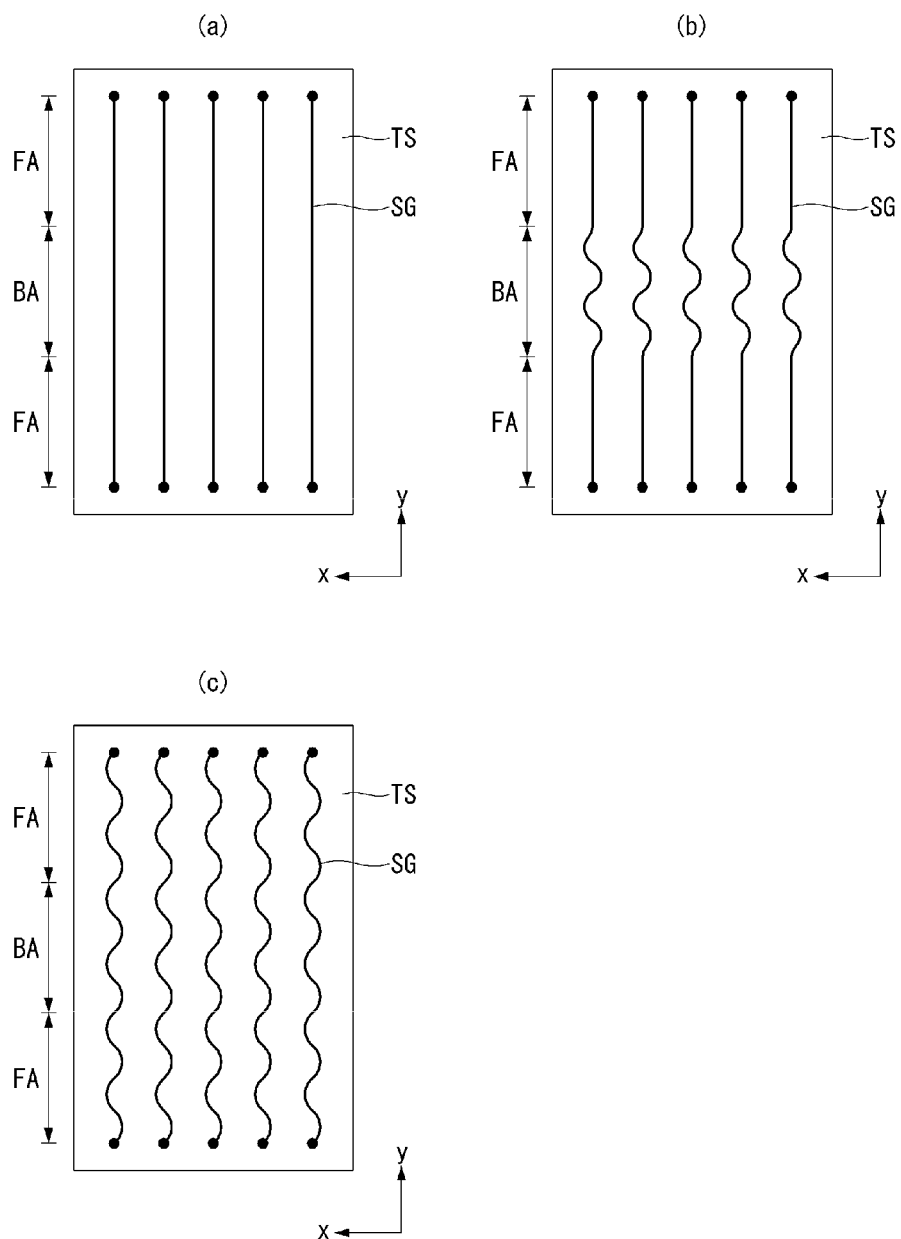
FIG. 38 illustrates strain gauge printing forms according to various embodiments.

FIG. 38 illustrates strain gauge printing forms according to various embodiments.

The strain gauge SG may be extended in a straight line on the elastic member TS irrespective of printing positions thereon, as shown in FIG. 38(a). The strain gauge SG may be extended in a straight line in a flat area FA of the elastic member TS and bent at least once in a bent area BA of the elastic member TS, as shown in FIG. 38(b). Otherwise, the strain gauge SG may be bent at least once on the elastic member TS irrespective of printing positions thereon, as shown in FIG. 38(c).

A difference between lengthening portions of the elastic member TS may be compensated according to a bending form of the strain gauge SG during changing to the second state. That is, it is possible to prevent the strain gauge SG from being cut or cracked according to a bending form of the strain gauge SG.

However, when the strain gauge SG is formed in a straight line, the manufacturing process can be simplified to reduce manufacturing costs and the resistance of the strain gauge SG can be measured more accurately because a strain gauge width variation become clearer.

Accordingly, the user can appropriately adjust bending portions and a bending form of the strain gauge and print the strain gauge SG on the elastic member TS.

Although not illustrated, the shape of one strain gauge SG may differ from that of a neighboring strain gauge SG. For example, one strain gauge SG may be extended in a straight line and a neighboring strain gauge SG may be bent at least once.

Figure 39:
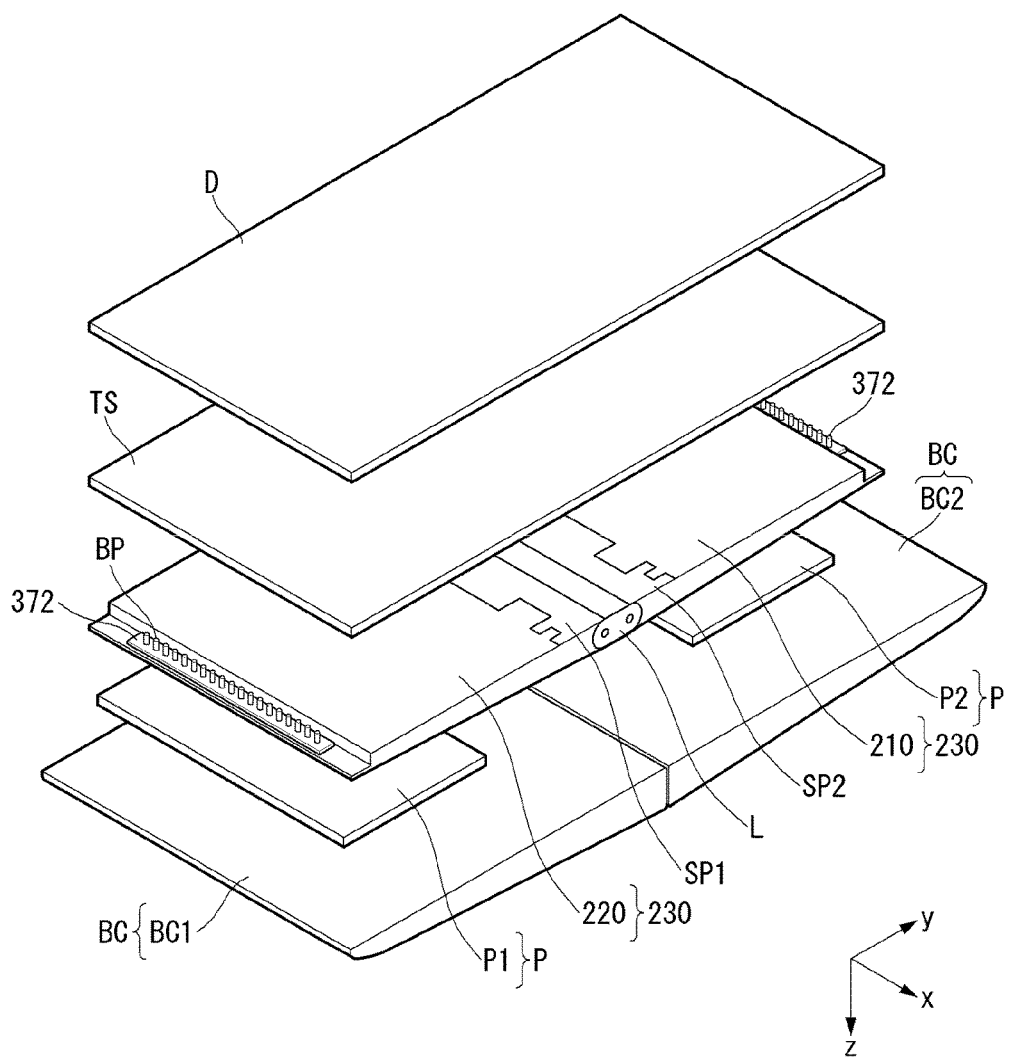
FIGS. 39 to 41 illustrate the mobile terminal according to an embodiment of the present invention.
Figure 40:
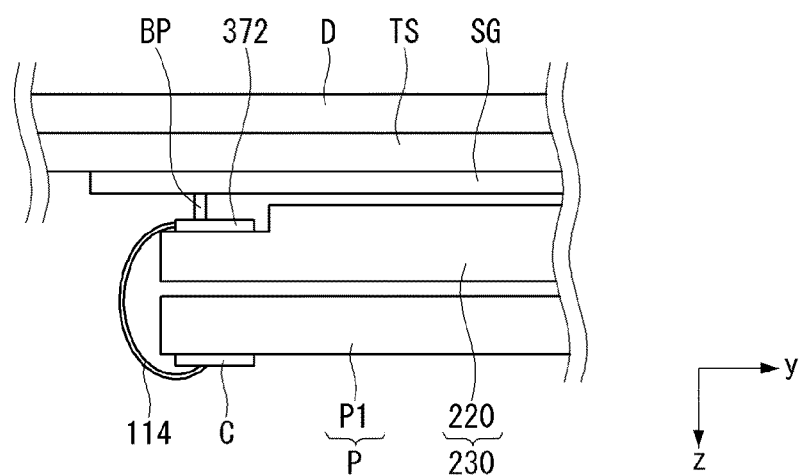
Figure 41:
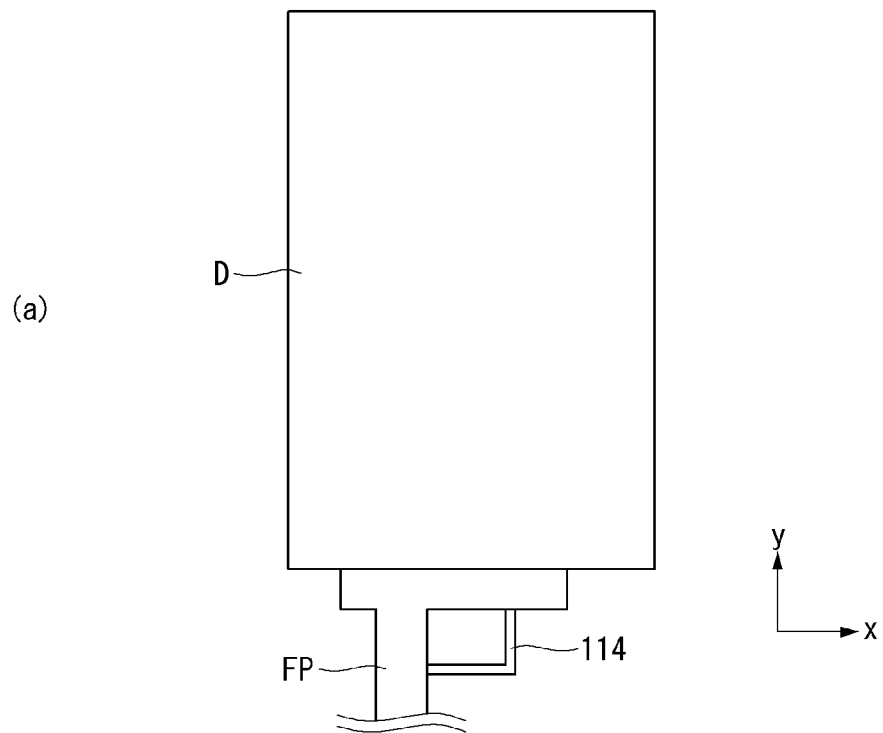
Figure 41:
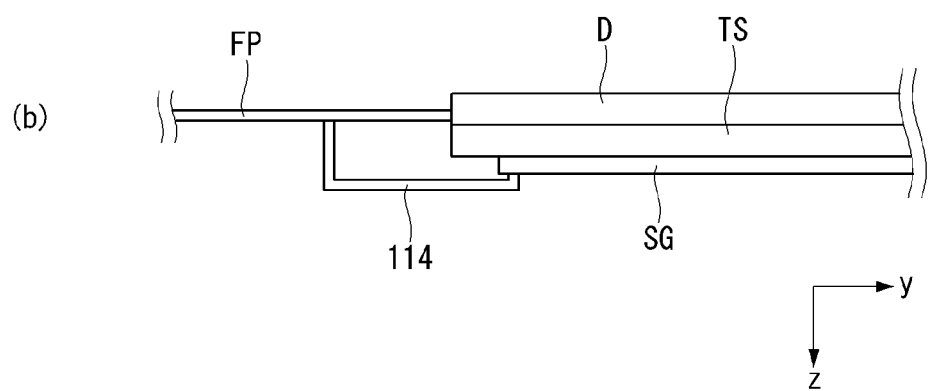

FIGS. 39 to 41 illustrate the mobile terminal according to an embodiment of the present invention.

Referring to FIG. 39, a back cover BC may be provided to the rear surface of the body 230. The back cover BC may cover the rear surface and the side of the body 230. Both edges of the back cover BC may have a curvature. Accordingly, a clean appearance of the mobile terminal can be provided.

A board P may be positioned between the back cover BC and the body 230. That is, the board P may be provided to the rear side of the body 230. The board P may include first and second boards P1 and P2 having a hinge assembly L interposed therebetween. The first and second boards P1 and P2 may be separated from each other and at least one circuit pattern may be printed thereon.

Both edges of the body 230 may be recessed. That is, the height of both edges of the body 230 may differ from other portions of the body 230.

A base 372 may be provided to the recessed portions of the body 230. That is, the base 372 may be provided to both edges of the body 230. The base 372 may include pogo pins BP protruding to the elastic member TS, which is provided to at least part of the base 372. The base 372 may be electrically connected to the board P such that the resistance of the strain gauge positioned on the lower surface of the elastic member TS can be measured through the pogo pins BP. Electrical connection between the board P and the strain gauge will be described below.

Referring to FIG. 40, the strain gauge SG may be connected to the board P through the pogo pins BP connected to one end thereof. Specifically, the pogo pins BP and a wiring circuit 114 may be electrically connected through a circuit pattern printed on the base 372, and the wiring circuit 114 may be electrically connected to a connector C provided on the board P. The wiring circuit 114 may be connected to the connector C over the side of the body 230.

Although FIG. 40 illustrates that the base 372 is connected to the strain gauge SG through the pogo pins BP, the present invention is not limited thereto and the base 372 may be connected to the strain gauge SG through a clip.

Referring to FIG. 41, a flexible printed circuit board (FPCB) FP connected to one side of the display D may be provided. The FPCB FP may be electrically connected to the display D. The FPCB FP may be electrically connected to the board (not shown). The FPCB FP may transmit image information, which is delivered from the board, to the display D.

In the mobile terminal according to the present embodiment, the wiring circuit 114 may electrically connect the strain gauge SG to the FPCB FP. One end of the wiring circuit 114 may be connected with one end of the strain gauge SG through soldering and the other end of the wiring circuit 114 may be connected with a circuit pattern of the FPCB FP through soldering.

In the mobile terminal according to the present embodiment, the strain gauge SG may be directly connected to the FPCB FP. Accordingly, the base or the recessed portions of the body are not needed and thus the manufacturing process can be simplified and manufacturing costs can be reduced.

Figure 42:
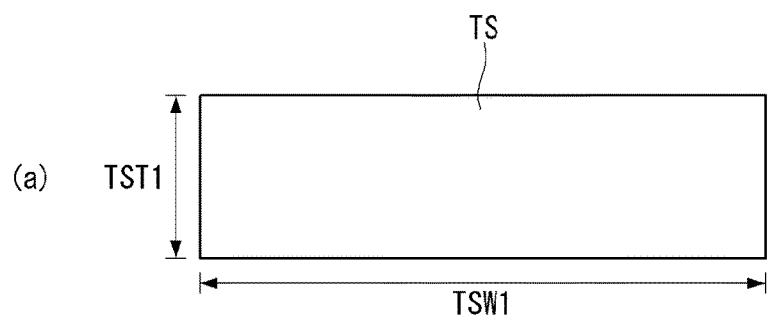
FIGS. 42 and 43 illustrate variations according to state change in the mobile terminal according to the present invention.
Figure 42:
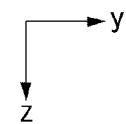
Figure 42:
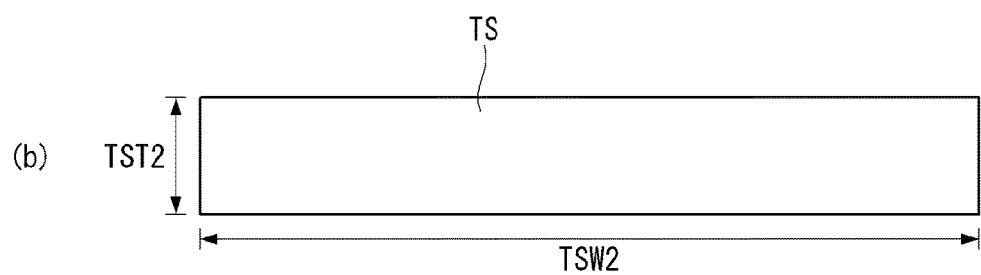
Figure 42:
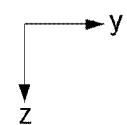
Figure 43:
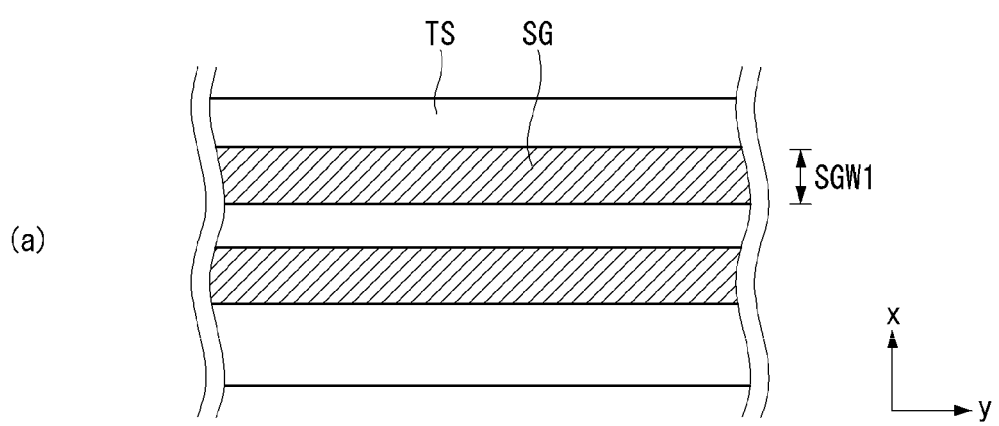
Figure 43:
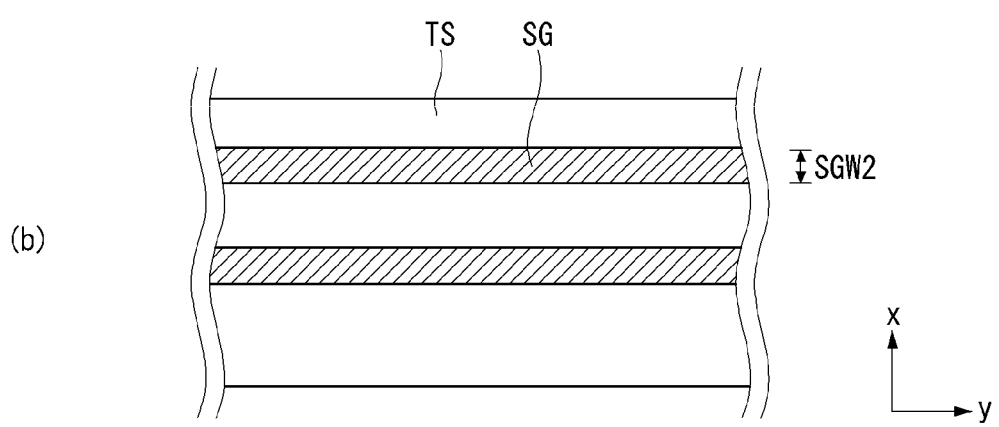

FIGS. 42 and 43 illustrate changes in the mobile terminal according to the present invention in response to state change of the mobile terminal.

Referring to FIG. 42(a), the elastic layer TS may have a first width TSW1 in a first direction of the mobile terminal and a first thickness TST1 in a third direction of the mobile terminal in the first state. For example, the first direction may be a y-direction corresponding to the thickness direction of the mobile terminal, a second direction may be an x-direction corresponding to the width direction of the mobile terminal and the third direction may be a z-direction corresponding to the thickness direction of the mobile terminal. This will be applied to other embodiments which will be described below.

Referring to FIG. 42(b), the elastic layer TS may be bent and lengthened in the second state and/or third state. Accordingly, the elastic layer TS may have a second width TSW2 in the first direction of the mobile terminal. The second width TSW2 may be greater than the first width TSW1. To offset the increasing length of the elastic layer TS, the elastic layer TS may have a second thickness TST2, which is less than the first thickness TST1, in the third direction of the mobile terminal.

The elastic layer TS can offset the width in the first direction while reducing the thickness in the third direction even when the first state changes to the second state because the elastic layer TS is formed of a material having high elasticity. Accordingly, the elastic layer TS may not be cracked or damaged.

Referring to FIG. 43, the width of the elastic layer TS in the first direction may increase when the first state changes to the second state. Accordingly, the width of the strain gauge SG, attached to the elastic layer TS, in the first direction may also increase when the first state changes to the second state.

Referring to FIG. 43(a), the strain gauge SG attached to the elastic layer TS may have a first gauge width SGW1 in the second direction in the first state. Referring to FIG. 43(b), the width of the strain gauge SG in the first direction may increase in the second state and/or the third state, as described above. To offset the increasing width, the strain gauge SG may have a second gauge width SGW2 in the second direction. The second gauge width SGW2 may be less than the first gauge width SGW1.

The resistance of a lead is proportional to the length thereof and inversely proportional to the thickness thereof. Accordingly, when the first state changes to the second state, the length of the strain gauge SG increases and thus the resistance of the strain gauge SG increases since the second gauge width SGW2 is less than the first gauge width SGW1.

Figure 44:
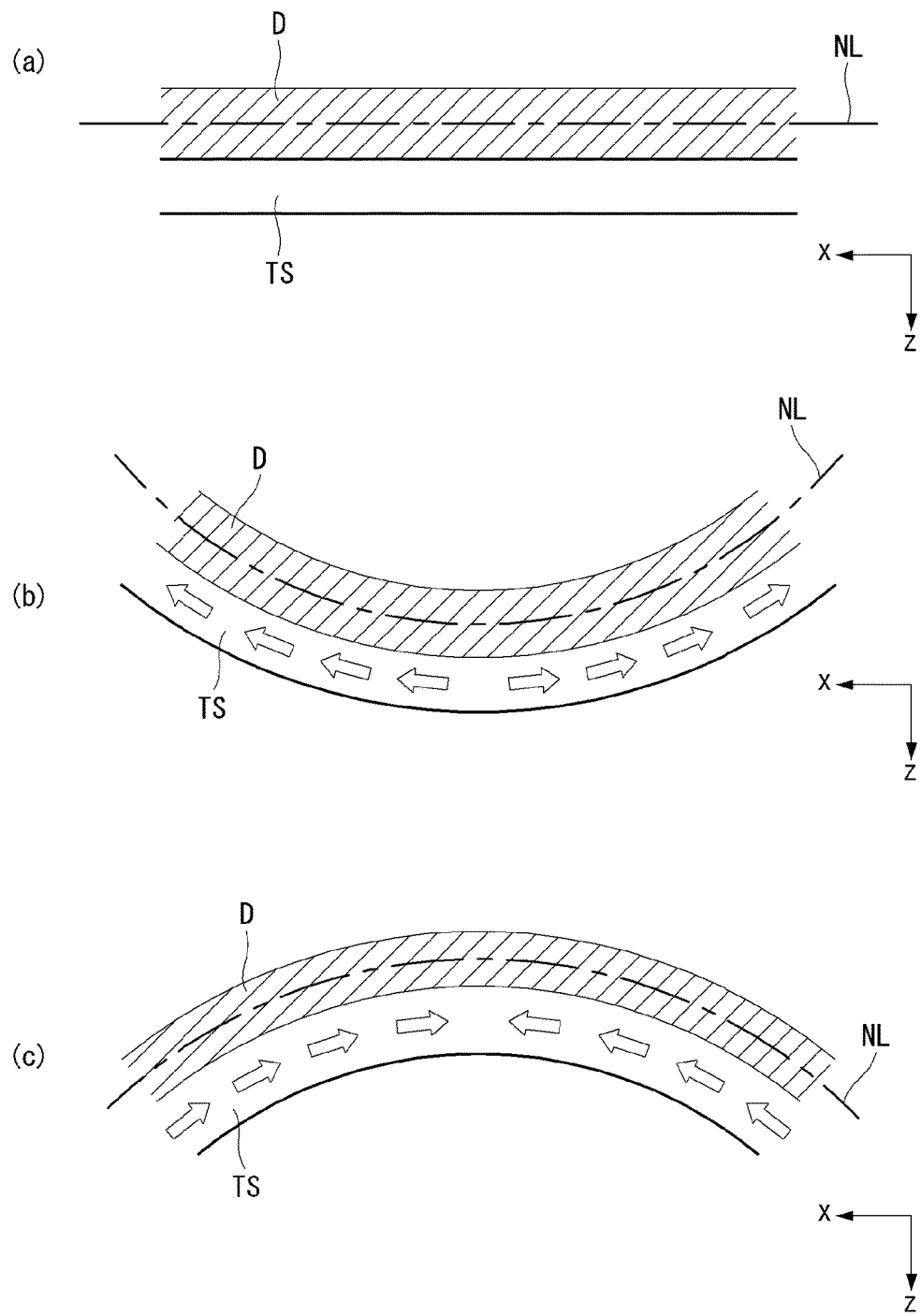
FIG. 44 illustrates a function of an elastic layer according to an embodiment of the present invention.

FIG. 44 illustrates the function of the elastic layer according to an embodiment of the present invention.

As shown, the elastic layer TS according to an embodiment of the present invention may be provided to the rear side of the display D. The elastic layer TS provided to the rear side of the display D can reduce physical stress applied to the display D.

Referring to FIG. 44(a), the elastic layer TS may be positioned on the rear side of the display D. At least part of the elastic layer TS may be attached to the rear side of the display D. For example, all or some of one side of the elastic layer TS may be attached to the display D.

The neutral surface NL may be present in the display D. The neutral surface NL may be a reference plane during bending of the display D. For example, the neutral surface NL may have little tension and/or compression during bending.

The position of the neutral surface NL may be determined according to relationship between the display D and components related thereto. For example, the position of the neutral surface TS may be determined by a relationship between the modulus of the display D and the modulus of the elastic layer TS. When the modulus of the elastic layer TS is greater than that of the display D, bending may occur mainly in the elastic layer TS when bending force is applied thereto. Based on this fact, the position of the neutral surface NL can be set by controlling the modulus of the display D and the modulus of the elastic layer TS. In an embodiment of the present invention, the modulus of components related to the display D may be determined such that the neutral surface NL is set in the display D, to thereby decrease stress applied to the display D during bending.

Referring to FIG. 44(b), when the display D is bent in a direction in which the elastic layer TS is expanded, the display D and the elastic layer TS can be bent around the neutral surface NL of the display D. In this state, stress due to tension may be concentrated on the elastic layer TS. In other words, relatively low stress may be applied to the display D.

Referring to FIG. 44(c), when the display D is bent in a direction in which the elastic layer TS is compressed, the display D and the elastic layer TS can also be bent around the neutral surface NL of the display D. In this case, the amount of deformation of the display D is minimized and stress is applied to the elastic layer TS having a relatively large amount of deformation. Accordingly, even when bending is applied multiple times for a long time, the display D can be prevented from being damaged. Since the elastic layer TS to which relatively high stress is applied is made of a material robust to physical stress, such as silicon, the elastic layer TS is prevented from being damaged.

Figure 45:
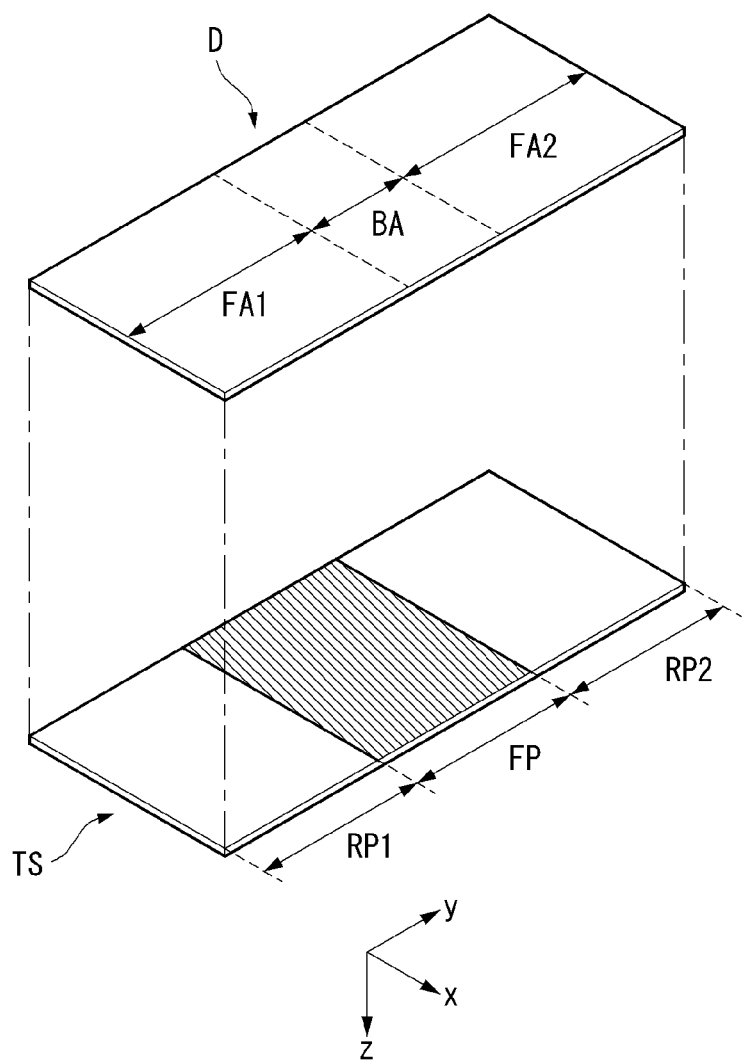
FIGS. 45 and 46 illustrate various embodiments of the elastic layer according to an embodiment of the present invention.
Figure 46:
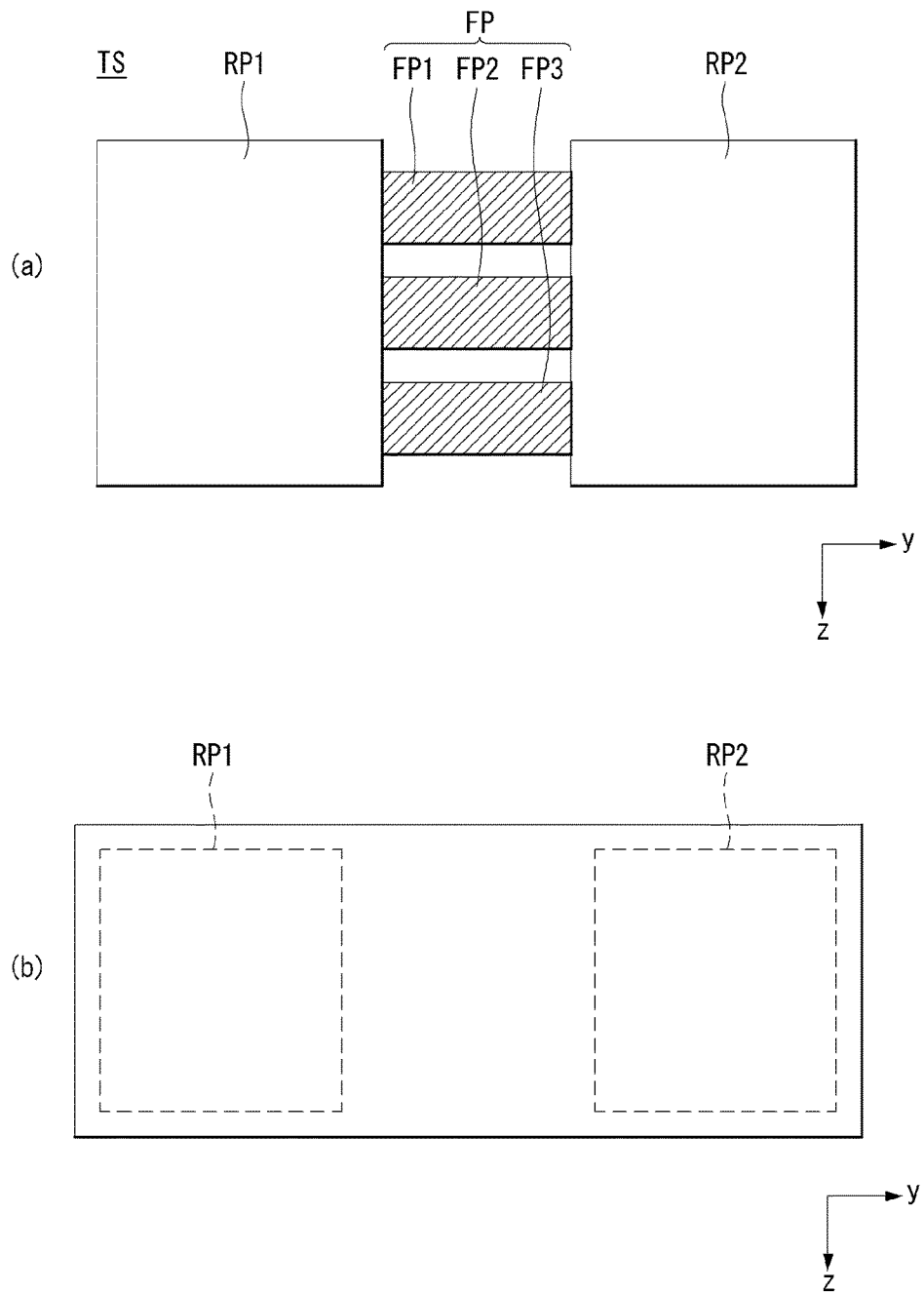

FIGS. 45 and 46 illustrate various examples of the elastic layer according to an embodiment of the present invention.

As shown, the elastic layer TS according to an embodiment of the present invention may include rigid parts RP1 and RP2 and a flexible part FP. The rigid parts RP1 and RP2 and the flexible part FP may be configured in various forms.

Referring to FIG. 45, the display D may include a bent area BA and flat areas FA1 and FA2. The elastic layer TS may include the flexible part FP and the rigid parts RP1 and RP2. The elastic layer TS may be superposed on the display D. For example, the overall area of the elastic layer TS may be positioned within the area of the display D.

The flexible part FP may correspond to the bent area BA of the display D. For example, the flexible part FP may have a size including the bent area BA. In other words, the width of the flexible part FP may be greater than the width of the bent area BA. Accordingly, when the bent area BA is bent, the flexible part FP can sufficiently offset deformation of the display D.

The flexible part FP may support the bent area BA of the display D. That is, the flexible part FP may be bent together with the display D when the display D is bent while supporting the bent area BA. The aforementioned strain gauge SG may be provided to the rear side of the flexible part FP.

The rigid parts RP1 and RP2 of the elastic layer TS may be divided into a plurality of regions. For example, a first rigid part RS1 and a second rigid part RP2 may be arranged with the elastic layer TS interposed therebetween. The first and second rigid parts RP1 and RP2 may correspond to the first and second flat areas FA1 and FA2 of the display D. Accordingly, the bent area BA of the display D can be bent without any resistance in spite of presence of the first and second rigid parts RP1 and RP2.

The first and second rigid parts RP1 and RP2 may support the display D. For example, the first and second rigid parts RP1 and RP2 may support the rear side of the display D such that the display D remains flat in a flat state in which the first and second bodies 210 and 220 are flat. For example, the first and second rigid parts RP1 and RP2 can support the display D such that the display D is not moved when the display D is touched. To effectively support the display D, the first and second rigid parts RP1 and RP2 may be configured as flat metal plates.

Referring to FIG. 46(a), the flexible part FP may be divided into a plurality of regions. For example, the flexible part FP may include first, second and third flexible parts FP1, FP2 and FP3. The first, second and third flexible parts FP1, FP2 and FP2 may be arranged at intervals and connect the first and second rigid parts RP1 and RP2. Since the first, second and third flexible parts FP1, FP2 and FP3 are arranged at intervals, resistance during bending may be further reduced.

Referring to FIG. 46(b), the flexible part FP may include the first and second rigid parts RP1 and RP2. For example, the first and second rigid parts RP1 and RP2 may be molded to the flexible part FP through insert injection molding. Because the flexible part FP includes the first and second rigid parts RP1 and RP2, the first and second rigid parts RP1 and RP2 are not exposed to the outside. Accordingly, when the first and second rigid parts RP1 and RP2 are formed of a metal, the first and second rigid parts RP1 and RP2 are not exposed to humidity and thus the durability thereof can be improved.

Figure 47:
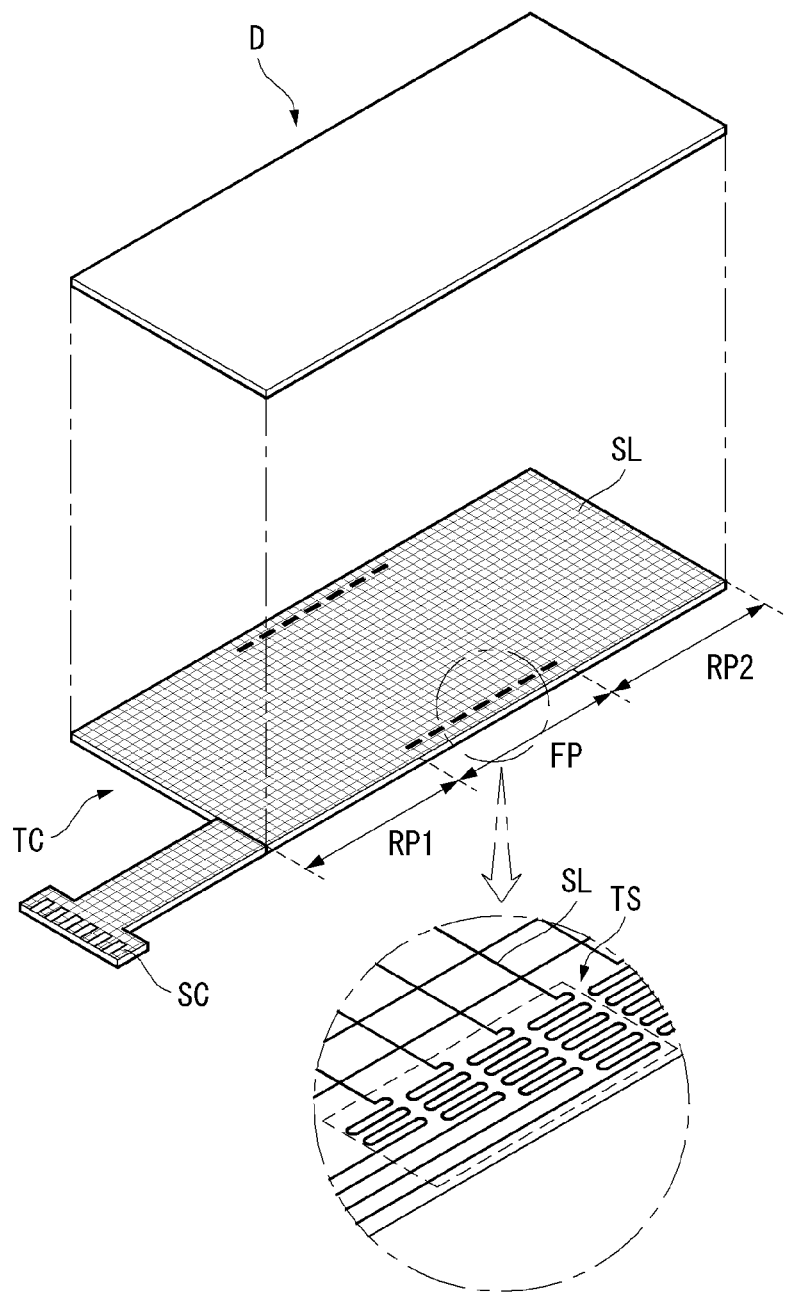
FIG. 47 illustrates a touch sensor of the mobile terminal according to an embodiment of the present invention.

FIG. 47 illustrates a touch sensor of the mobile terminal according to an embodiment of the present invention.

As shown, the mobile terminal 100 according to an embodiment of the present invention may include a touch sensor TC. The touch sensor TC may be positioned between the display D and the elastic layer TS. The touch sensor TC may be integrated with the display D. For example, a touch pattern may be formed on the rear side of the display D.

The touch sensor TC may sense a user's touch applied to the mobile terminal 100. The touch sensor TC may be provided to the rear side of the display D. The touch sensor TC may be integrated with the display D.

At least part of the touch sensor TC may be flexible. For example, the touch sensor TC may include a touch flexible part TFP. The touch flexible part TFP may correspond to the bent area BA of the display D. Accordingly, the touch flexible part TFP may be bent together with the display D when the display D is bent.

The touch sensor TC may include sensor lines SL. The sensor lines SL may be horizontal and/or vertical lines formed on the touch sensor TS to sense touch. The sensor lines SL may be electrically connected to the controller 180 of the mobile terminal 100 through a sensor line connector SC. The sensor line SL may include a gauge part GP.

The gauge part GP may be provided to the side of the touch sensor TC. For example, the gauge part GP may be arranged along both sides of the touch sensor TC in the length direction of the touch sensor TC. The gauge part GP may be parts of the sensor lines SL, which are arranged in a zigzag form. For example, the gauge part GP may be a region in which the sensor lines SL are arranged back and forth multiple times within a range of a first width W1 and a first length D1. The total length of the sensor lines SL may increase due to the gauge part GP. For example, if the total length of the sensor lines SL is A when the gauge part GP is not present, the total length of the sensor lines SL may be A+B when the gauge part GP is present.

The gauge part GP may be positioned within the touch flexible part TFP. The gauge part GP may be arranged at both sides of the touch flexible part TFP.

The gauge part GP arranged at both sides of the touch flexible part TFP may sense bending of the touch sensor TC. For example, when the touch sensor TC is bent, some or all of the sensor line parts included in the gauge part GP may be expanded and/or compressed and thus resistance thereof may change. Upon sensing the resistance variation, the controller 180 can determine that the mobile terminal 100 is bent. The controller 180 may determine a bending degree of the mobile terminal 100 on the basis of the amount of resistance variation.

Since the gauge part GP is arranged in a zigzag form, a resistance variation due to bending may be amplified. For example, although a resistance variation in one sensor line SL arranged in the direction of the first length DL may be small, the sum of resistance variations in sensor lines arranged multiple times within an area of the first length D1 and the first width W1 may be sufficiently large.

The gauge part GP may be provided together with the strain gauge SG. For example, the gauge part GP is provided to the touch sensor TC and the strain gauge SG may be provided to the elastic layer TS. The controller 180 may determine whether the mobile terminal is bent and/or a bending degree of the mobile terminal 100 by sensing a resistance variation in the sensor lines SL due to the gauge part GP and a resistance variation due to the strain gauge SG.

The gauge part GP and the strain gauge SG may be selectively provided. When only the gauge part GP is provided, an additional process for forming the strain gauge SG may not be needed.

Figure 48:
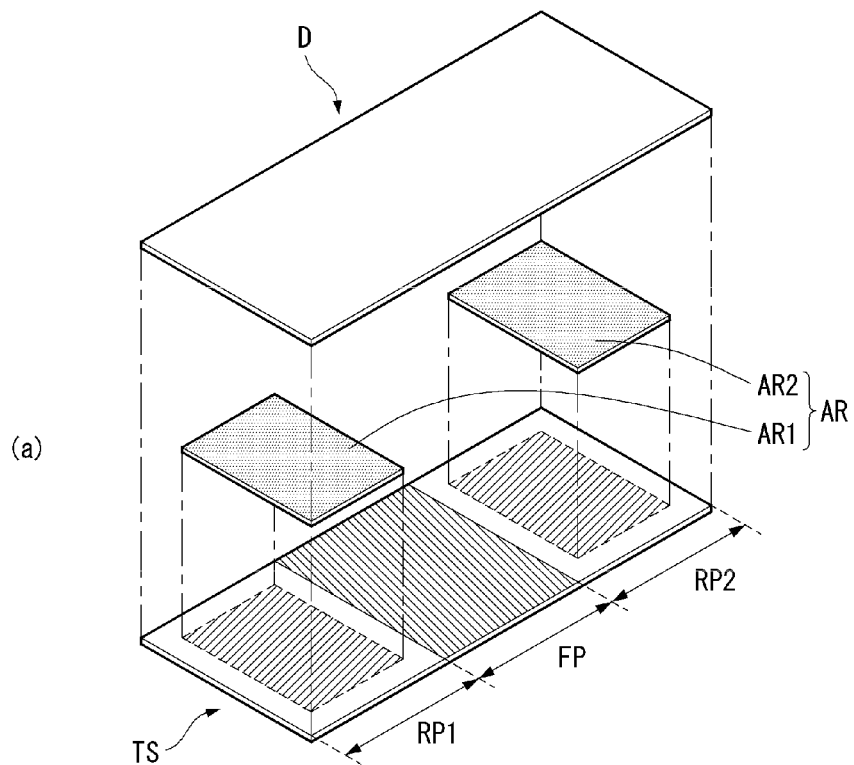
FIGS. 48 and 49 illustrate an adhesive part of the elastic layer according to an embodiment of the present invention.
Figure 48:
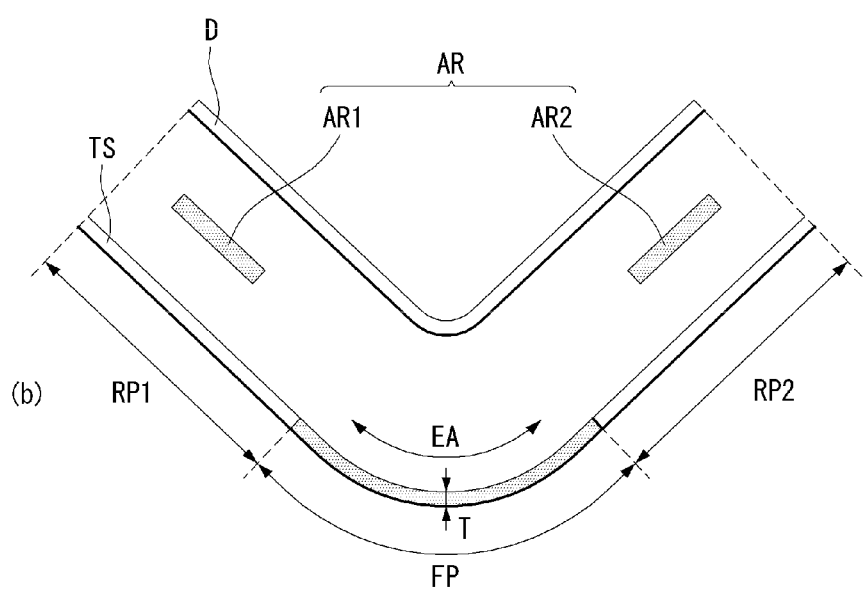
Figure 49:
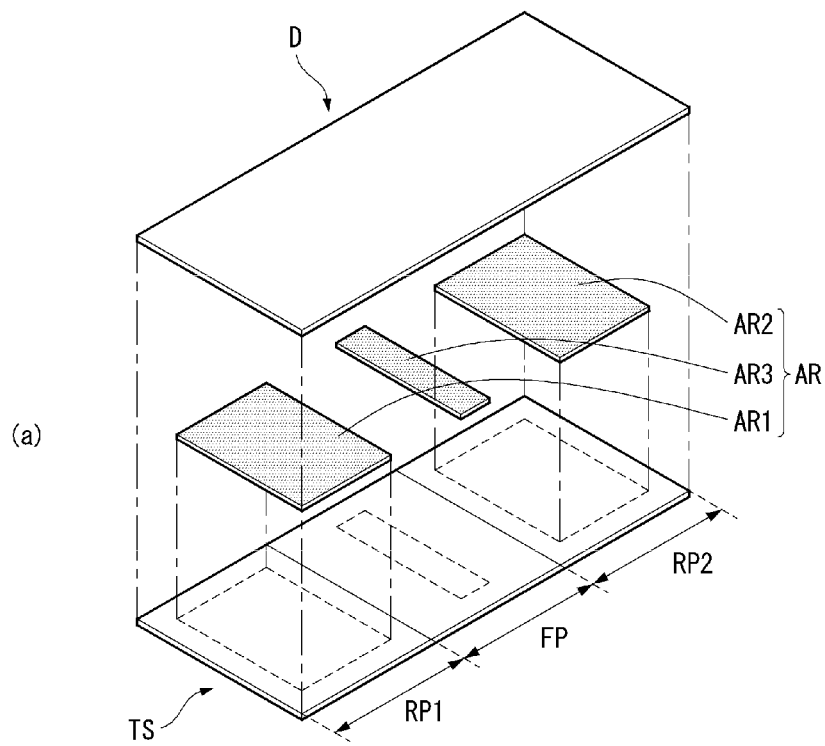
Figure 49:
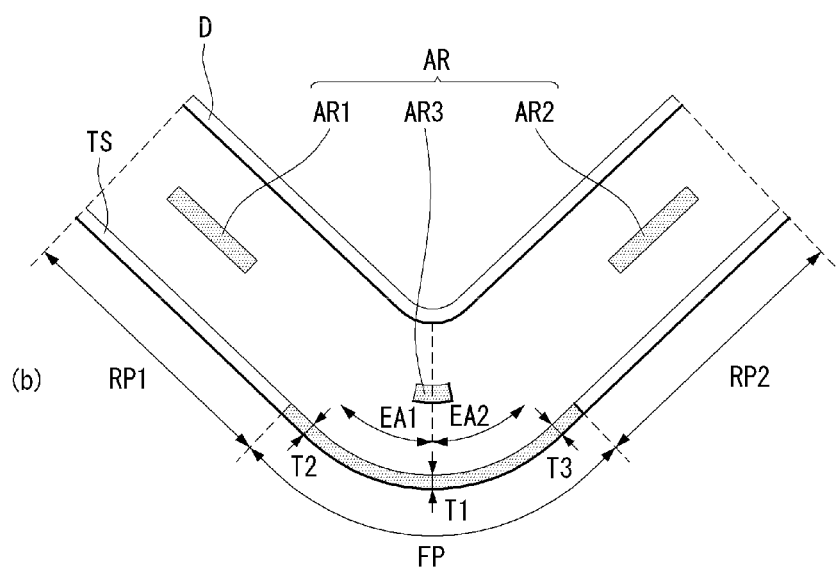

FIGS. 48 and 49 illustrate an adhesive part of the elastic layer according to an embodiment of the present invention.

As shown, the elastic layer TS according to an embodiment of the present invention may be attached to the display D through an adhesive layer AR.

Referring to FIG. 48(a), the adhesive layer AR may be positioned on the display D and the elastic layer TS.

The adhesive layer TS may be a double-sided tape, an adhesive or the like. The elastic layer TS can be attached to the rear side of the display D using the adhesive layer AR.

A plurality of adhesive layers AR may be provided. For example, first and second adhesive layers AR1 and AR2 may be provided to different positions.

The first and second adhesive layers AR1 and AR2 may be positioned on the first and second rigid parts RP1 and RP2. That is, the first and second adhesive layers AR1 and AR2 may be provided to regions having no or a little influence of bending in the elastic layer TS.

Referring to FIG. 48(b), the elastic layer TS may be fixed to the display D through the first and second adhesive layers AR1 and AR2. In other words, the first and second rigid parts RP1 and RP2 may be fixed to the display D.

When the display D is bent, the flexible part FP of the elastic layer TS may be expanded. For example, tension may occur in an expanded area EA corresponding to the entire area of the flexible part FP. When the flexible part FP is expanded, the thickness T of the expanded area EA may decrease. That is, the expanded area EA can be thinned.

Referring to FIG. 49(a), the adhesive layer AR may include first, second and third adhesive layers AR1, AR2 and AR3. The first and second adhesive layers AR1 and AR2 may be respectively provided to the first and second rigid parts RP1 and RP2 whereas the third adhesive layer AR3 may be provided to the flexible part FP. In other words, the second adhesive layer AR2 may be attached to the center of the flexible part FP and the center of the display D.

Referring to FIG. 49(b), when the display D is bent, the flexible part FP of the elastic layer TS may be bent and expanded. When the flexible part FP is deformed, the thickness of the flexible part FP may change to different degrees according to positions. For example, if the thickness of a region of the elastic layer, which corresponds to the third adhesive layer AR3, is T1, the thicknesses of first and second expanded areas EA1 and EA2 on both sides of the third adhesive layer AR3 may be T2 and T3, respectively. T2 and T3 may be identical. Such thickness difference may be caused by the third adhesive layer AR3 attached to the flexible part FP of the elastic layer TS. Due to the third adhesive layer AR3, the flexible part FP may be bent more naturally when the display D is bent.

Figure 50:
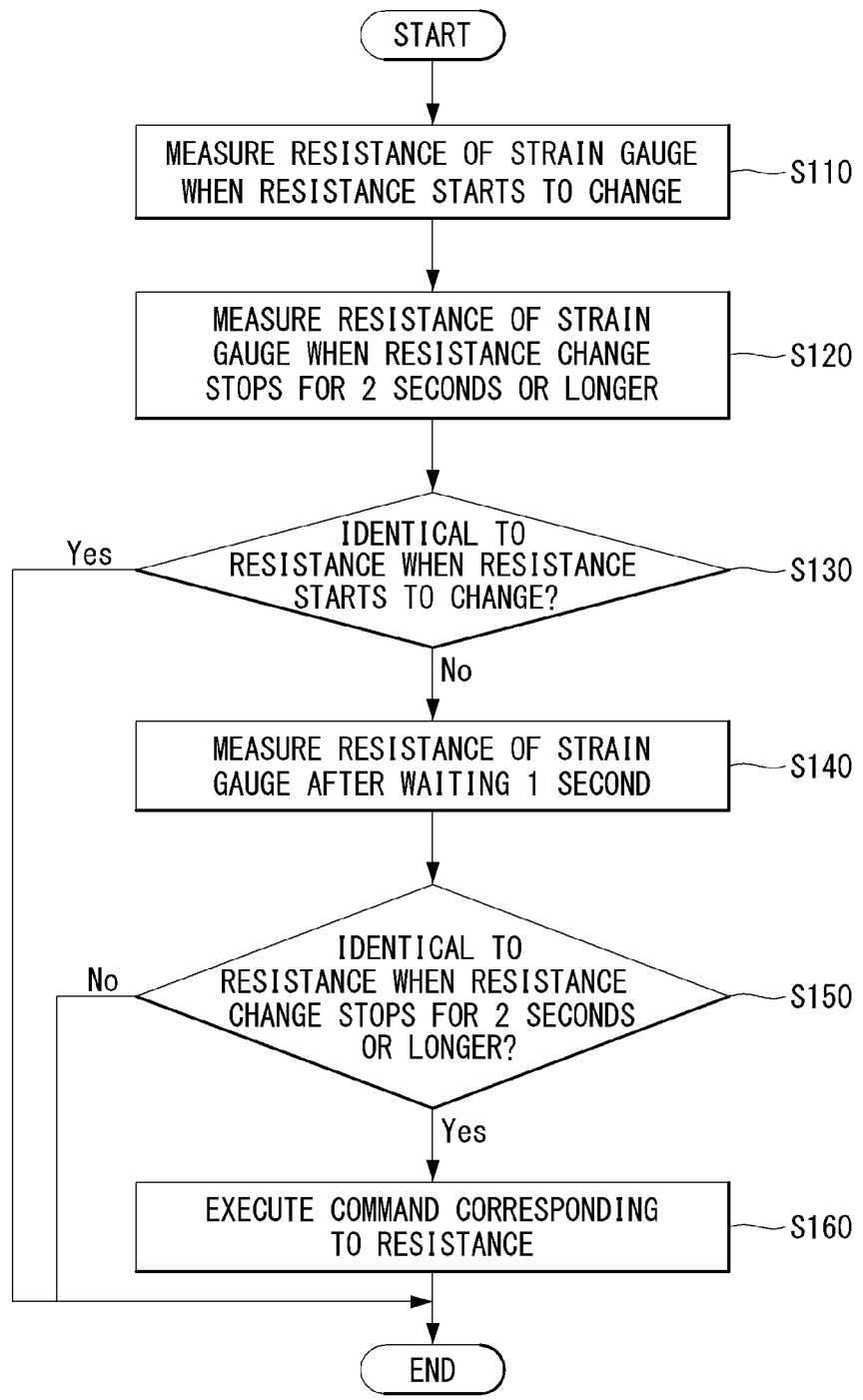
FIG. 50 is a flowchart illustrating a method of controlling the mobile terminal according to the present invention.

FIG. 50 is a flowchart illustrating a method of controlling the mobile terminal according to the present invention.

As shown in FIG. 50, operations of the mobile terminal may be controlled by sensing a state change in the strain gauge. The mobile terminal may include the controller. The controller may be driven to execute application programs (or applications) with respect to the display and data and commands for operations of the mobile terminal.

The controller controls overall operation of the mobile terminal in addition to operations related to the application programs. The controller may process signals, data, information and the like, input or output through the aforementioned components, or execute application programs stored in the memory to provide appropriate information or functions to the user or process the same.

Specifically, the controller may measure the resistance of the strain gauge when the resistance starts to change (S110). That is, the controller may measure the resistance of the strain gauge in the first state.

The controller may measure the resistance of the strain gauge when resistance change stops for two seconds or longer (S120). The resistance of the strain gauge may increase as the first state changes to the second state, as described above. Accordingly, no change in the resistance of the strain gauge may mean that folding of the mobile terminal is stopped.

In this case, if the resistance of the strain gauge is measured immediately after resistance change in the strain gauge stops, it may be impossible to clearly determine whether the resistance change stops due to temporary error. Accordingly, the next step is performed when resistance change in the strain gauge stops for two seconds or longer.

The controller may determine whether the resistance of the strain gauge when resistance change in the strain gauge stops is identical to the resistance of the strain gauge when the resistance starts to change (S130). That is, the controller may determine whether the measured resistance of the strain gauge is identical to the resistance in the first state. If the measured resistance of the strain gauge is identical to the resistance in the first state, this means that the mobile terminal is unfolded and remains in the first state. Accordingly, the controller may not execute any command.

If the measured resistance of the strain gauge differs from the resistance in the first state, the controller may wait one second more and then measure the resistance of the strain gauge (S140). In this case, the controller can check whether the mobile terminal is being folded or remains in a folded state by measuring the resistance of the strain gauge after waiting one second.

Subsequently, the controller may determine whether the resistance of the strain gauge when resistance change in the strain gauge stops for two seconds or longer is identical to the resistance measured after waiting one second (S150). If the resistance of the strain gauge when resistance change in the strain gauge stops for two seconds or longer differs from the resistance measured after waiting one second, this means that the mobile terminal is being folded. Accordingly, the controller may not execute any command.

Conversely, if the resistance of the strain gauge when resistance change in the strain gauge stops for two seconds or longer is identical to the resistance measured after waiting one second, the controller may execute a command based on the measured resistance of the strain gauge.

Because the resistance of the strain gauge depends on a folding angle of the mobile terminal, the controller may execute a command corresponding to a specific angle at which the mobile terminal is folded.

Figure 51:
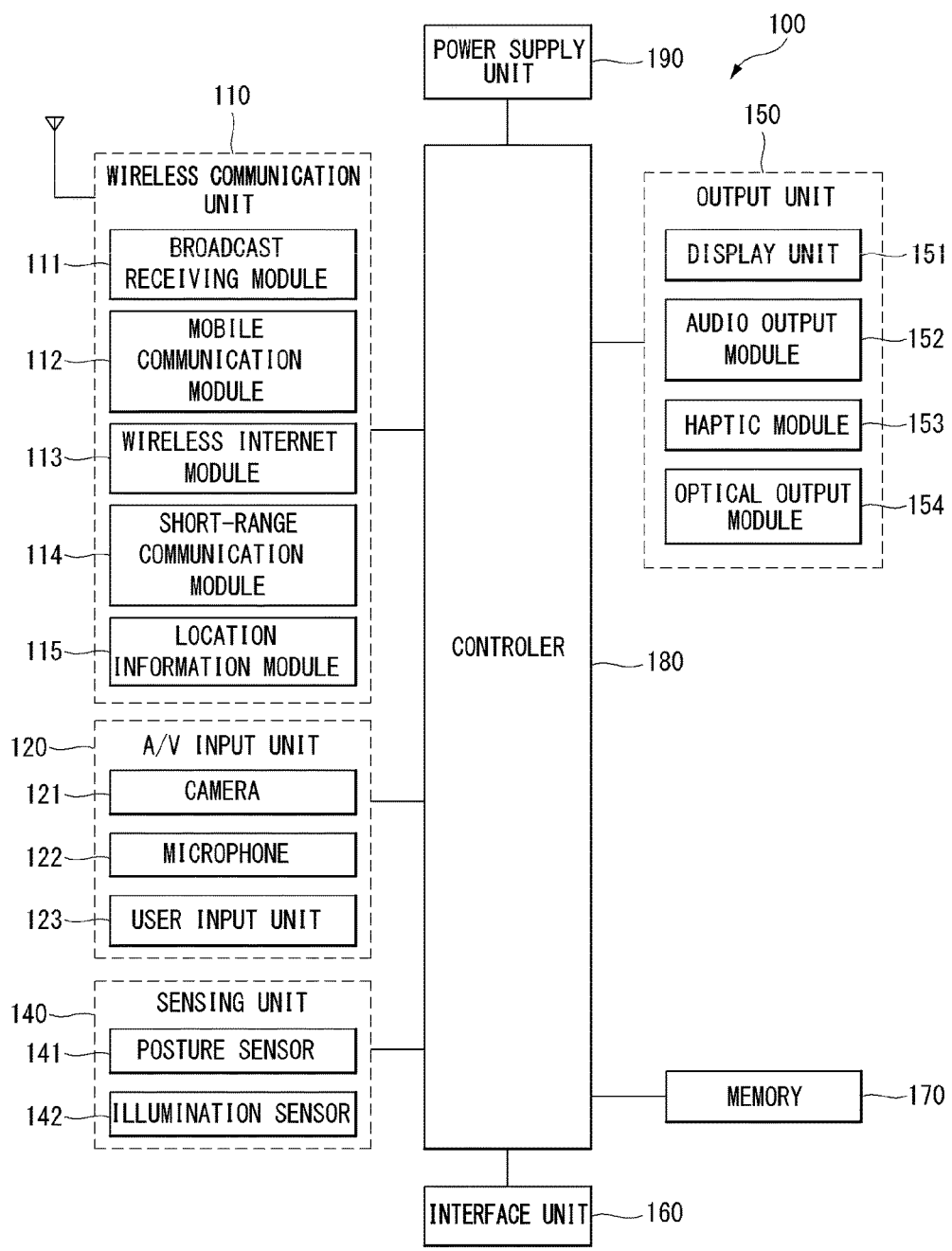
FIG. 51 is a block diagram of a mobile terminal according to an embodiment.

FIG. 51 is a block diagram of a mobile terminal according to an embodiment. Other embodiments, configurations and arrangements may also be provided.

As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply 190. The components shown in FIG. 51 may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141. The sensing unit 140 may sense a motion of the mobile terminal 100.

The output unit 150 may generate visual, auditory and/or tactile output, and the output unit 150 may include the display 151, an audio output module 152, an alarm 153 and a haptic module 154. The display 151 may display information processed by the mobile terminal 100. The display 151 may display a user interface (UI) and/or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user may see an object located behind the body (of the mobile terminal 100) through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 (of the sensing unit 140) may be located in an internal region of the mobile terminal 100, surrounded by the touch screen, and/or near the touch screen. The proximity sensor 141 may sense an object approaching a predetermined sensing face or an object located near the proximity sensor 141 using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a body including first and second bodies and being in one of a first state in which the first and second bodies are positioned on a same plane and a second state in which one of the first and second bodies is folded with respect to another one of the first and second bodies;
   a display assembly disposed at one side of the first and second bodies, at least part of the display assembly being superposed on the first and second bodies;
   an elastic layer positioned between the display assembly and the body, at least part of the elastic layer being connected to at least one of the first and second bodies;
   an adhesive layer positioned between the display assembly and the elastic layer; and
   a flexible film including a first buffer layer, a film body, and a second buffer layer, sequentially laminated on the adhesive layer,
   wherein the display assembly includes a flat area remaining flat in the second state, and a bent area bent in the second state,
   wherein the display assembly comprises a display panel, a first layer provided to a front side of the display panel, and a second layer provided to a rear side of the display panel,
   wherein at least part of the second layer provided to the rear side of the display panel is connected to a frame fixed to the body,
   wherein the elastic layer includes a rigid part corresponding to the flat area and a flexible part corresponding to the bent area,
   wherein the first buffer layer includes a material having elasticity lower than the film body and higher than the display assembly,
   wherein the second buffer layer includes a material having higher elasticity than the film body.

2. The mobile terminal of claim 1, wherein a modulus of the first layer differs from that of the second layer.

3. The mobile terminal of claim 1, wherein a neutral surface of the display assembly is formed such that the display assembly is bent around the display panel.

4. The mobile terminal of claim 1, wherein the display assembly further comprises a silicon layer positioned between the display panel and at least one of the first and second layers.

5. The mobile terminal of claim 1, wherein the frame includes first and second frames positioned in the flat area provided to the rear side of the display panel and connected to the display assembly,
   wherein the display assembly further comprises a flexible folding support positioned in the bent area between the first and second frames and supporting the display panel.

6. The mobile terminal of claim 5, wherein the frame further includes frame holes corresponding to slits in the length direction of the display assembly,
   wherein the folding support further includes guide pins inserted into the frame holes and moved in the frame hole according to a state change in the display assembly.

7. The mobile terminal of claim 6, wherein the frame holes are arranged symmetrically with the first and second frames.

8. The mobile terminal of claim 5, wherein the folding support further includes a plurality of through-holes.

9. The mobile terminal of claim 5, wherein the through-holes are slits formed in the width direction of the display assembly.

10. The mobile terminal of claim 1, further comprising a connecting part positioned at the center of the rear side of the display assembly, one side of the connecting part being connected to the display assembly and the other side being connected to the body.

11. The mobile terminal of claim 1, further comprising at least one strain gauge provided to the rear side of the elastic layer.

12. The mobile terminal of claim 11, wherein at least one of lengths of the at least one strain gauge in a first direction corresponding to the length direction of the mobile terminal and a second direction corresponding to the width direction of the mobile terminal changes as the first state changes to the second state.

* * * * *